US012526777B2

(12) United States Patent
Li et al.

(10) Patent No.: US 12,526,777 B2
(45) Date of Patent: Jan. 13, 2026

(54) CONFIGURING A RETUNING GAP AND AMPLITUDE AND PHASE CONTINUITY FOR SENSING AND WIRELESS COMMUNICATIONS

(71) Applicant: QUALCOMM Incorporated, San Diego, CA (US)

(72) Inventors: Qiaoyu Li, Beijing (CN); Yu Zhang, San Diego, CA (US); Hao Xu, Beijing (CN); Min Huang, Beijing (CN); Jing Dai, Beijing (CN); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 18/000,278

(22) PCT Filed: Jul. 13, 2020

(86) PCT No.: PCT/CN2020/101545
§ 371 (c)(1),
(2) Date: Nov. 29, 2022

(87) PCT Pub. No.: WO2022/011492
PCT Pub. Date: Jan. 20, 2022

(65) Prior Publication Data
US 2023/0300805 A1 Sep. 21, 2023

(51) Int. Cl.
*H04W 4/00* (2018.01)
*H04W 72/0446* (2023.01)
(Continued)

(52) U.S. Cl.
CPC ....... *H04W 72/0446* (2013.01); *H04W 72/51* (2023.01); *H04W 74/002* (2013.01)

(58) Field of Classification Search
None
See application file for complete search history.

(56) References Cited

U.S. PATENT DOCUMENTS

| 4,628,312 A | 12/1986 | Hwang et al. |
| 5,648,955 A * | 7/1997 | Jensen ................. H04W 74/06 370/252 |

(Continued)

OTHER PUBLICATIONS

International Search Report and Written Opinion—PCT/CN2020/101545—ISA/EPO—Apr. 12, 2021.

*Primary Examiner* — Bob A Phunkulh
(74) *Attorney, Agent, or Firm* — Holland & Hart LLP/Qualcomm

(57) ABSTRACT

Methods, systems (100), and devices for wireless communications are described. In some systems (100), a base station (105) and a user equipment (UE) (115) may communicate over a shared radio frequency spectrum and may employ time-division multiplexing (TDM) techniques to multiplex sensing signals (315) with wireless communications in the shared radio frequency spectrum. In some examples, the base station (105) may configure the UE (115) with a first retuning gap during which the UE (115) may retune a radio frequency chain of the UE (115) when transitioning from a sensing signal (315) pulse to wireless communications and with a second retuning gap during which the UE may retune the radio frequency chain when transitioning from wireless communications to a sensing signal (315). In some other examples, the base station (105) may configure the UE (115) with a phase and amplitude continuity status of multiple adjacent sensing signal (315) pulses that may indicate whether the multiple adjacent sensing signal (315) pulses have phase and amplitude continuity.

60 Claims, 22 Drawing Sheets

(51) Int. Cl.
*H04W 72/51* (2023.01)
*H04W 74/00* (2009.01)

(56) References Cited

U.S. PATENT DOCUMENTS

| | | | |
|---|---|---|---|
| 5,835,199 | A | 11/1998 | Phillips et al. |
| 6,295,461 | B1* | 9/2001 | Palmer .................... H04B 1/69 |
| | | | 455/403 |
| 6,901,104 | B1* | 5/2005 | Du ........................ H04W 52/50 |
| | | | 375/150 |
| 8,223,802 | B2 | 7/2012 | Djahanshahi et al. |
| 10,390,250 | B2 | 8/2019 | Yang et al. |
| 2007/0183383 | A1* | 8/2007 | Bitran .................... H04W 88/06 |
| | | | 370/338 |
| 2012/0087265 | A1* | 4/2012 | Tamaki .................. H01Q 1/246 |
| | | | 370/252 |
| 2013/0044736 | A1* | 2/2013 | Tanaka .................. H04W 16/12 |
| | | | 370/336 |
| 2015/0063321 | A1 | 3/2015 | Sadek et al. |
| 2016/0239448 | A1* | 8/2016 | Maletsky ............ G06F 13/4068 |
| 2018/0213386 | A1* | 7/2018 | Kim ...................... H04L 5/0094 |
| 2019/0207737 | A1* | 7/2019 | Babaei ................ H04L 27/2607 |
| 2019/0289513 | A1* | 9/2019 | Jeon .................. H04W 72/0453 |
| 2019/0342826 | A1 | 11/2019 | Talarico et al. |
| 2021/0143971 | A1* | 5/2021 | Shim ................... H04L 25/0242 |
| 2021/0219320 | A1* | 7/2021 | Belleschi ............... H04W 72/20 |
| 2021/0286045 | A1* | 9/2021 | Bayesteh ............. H04B 7/0695 |
| 2021/0329693 | A1* | 10/2021 | Nogami ............ H04W 72/0453 |

\* cited by examiner

US 12,526,777 B2

CONFIGURING A RETUNING GAP AND AMPLITUDE AND PHASE CONTINUITY FOR SENSING AND WIRELESS COMMUNICATIONS

CROSS REFERENCE

The present Application is a 371 national stage filing of International PCT Application No. PCT/CN2020/101545 by LI et al. entitled "CONFIGURING A RETUNING GAP AND AMPLITUDE AND PHASE CONTINUITY FOR SENSING AND WIRELESS COMMUNICATIONS," filed Jul. 13, 2020, which is assigned to the assignee hereof, and which is expressly incorporated by reference in its entirety herein.

FIELD OF TECHNOLOGY

The following relates generally to wireless communications and more specifically to configuring a retuning gap and amplitude and phase continuity for sensing and wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A device capable of wireless communications may perform a sensing operation to determine a presence or a location of an object. In some cases, wireless communications and a sensing operation may be non-cooperative, such that wireless communications and the sensing operation may adversely affect each other.

SUMMARY

The described techniques relate to improved methods, systems, devices, and apparatuses that support configuring a retuning gap and amplitude and phase continuity for sensing and wireless communications. In some implementations, the described techniques may provide for the configuration of retuning gaps between communication signals (e.g., wireless communications) and sensing signals (e.g., sensing signal pulses) during which a user equipment (UE) may retune a radio frequency chain of the UE. A base station may configure the retuning gaps based on the relative operation points of a power amplifier of the UE for the communication signals and for the sensing signals. For example, the power amplifier of the UE may operate at different locations on an input voltage (Vin) to output voltage (Vout) curve for transmitting or receiving communication signals and for transmitting or receiving sensing signals, and the difference between the two locations on the curve may influence the amount of time the UE may take to retune the radio frequency chain of the UE when transitioning between communication signals and sensing signals. As such, based on configuring the retuning gaps of the UE based on the relative operation points of the power amplifier of the UE, the UE may more optimally retune the radio frequency chain of the UE.

Additionally, the UE may determine whether to transmit or receive communication signals between two sensing signals based on the configured retuning grants. For example, the UE may determine a time duration including a duration of a first retuning gap for retuning from a first sensing signal to a communication signal and a duration of a second retuning gap for retuning from the communication signal to a next sensing signal, determine whether the time duration is less than or equal to an inter-pulse interval between the two sensing signals, and determine whether to transmit or receive the communication signal between the two sensing signals based on whether the time duration is less than or equal to the inter-pulse interval.

In some other implementations, the described techniques may provide for signaling between the base station and the UE indicating whether multiple adjacent (e.g., consecutive) sensing signals have phase and amplitude continuity (e.g., whether multiple adjacent sensing signals have the same phase and amplitude). In some examples, the base station may transmit a configuration to the UE that indicates whether multiple adjacent sensing signals have phase and amplitude continuity. The base station may determine whether the multiple adjacent sensing signals have phase and amplitude continuity unilaterally or may determine whether the multiple adjacent sensing signals have phase and amplitude continuity based on a capability of the UE. Additionally, the UE may determine or assume (based on the configuration or regardless of the configuration) whether the multiple adjacent sensing signals have phase and amplitude continuity based on a presence of a communication signal between two consecutive sensing signals of the multiple adjacent sensing signals and based on one or more parameters of such a communication signal.

A method of wireless communications at a UE is described. The method may include receiving a configuration for time-division multiplexing (TDM) of sensing signals in a shared radio frequency spectrum band, identifying, from the configuration, an inter-pulse interval between a first sensing signal pulse and a second sensing signal pulse, determining whether to retune a radio frequency chain of the UE for wireless communications during the inter-pulse interval based on a duration of the inter-pulse interval and the configuration, and performing wireless communications either during the inter-pulse interval or outside of the inter-pulse interval based on the determination.

An apparatus for wireless communications at a UE is described. The apparatus may include a processor, memory coupled with the processor, and instructions stored in the memory. The instructions may be executable by the processor to cause the apparatus to receive a configuration for TDM of sensing signals in a shared radio frequency spectrum band, identify, from the configuration, an inter-pulse interval between a first sensing signal pulse and a second sensing signal pulse, determine whether to retune a radio frequency chain of the UE for wireless communications during the inter-pulse interval based on a duration of the inter-pulse interval and the configuration, and perform wireless communications either during the inter-pulse interval or outside of the inter-pulse interval based on the determination.

Another apparatus for wireless communications at a UE is described. The apparatus may include means for receiving a configuration for TDM of sensing signals in a shared radio frequency spectrum band, identifying, from the configuration, an inter-pulse interval between a first sensing signal pulse and a second sensing signal pulse, determining whether to retune a radio frequency chain of the UE for wireless communications during the inter-pulse interval based on a duration of the inter-pulse interval and the configuration, and performing wireless communications either during the inter-pulse interval or outside of the inter-pulse interval based on the determination.

A non-transitory computer-readable medium storing code for wireless communications at a UE is described. The code may include instructions executable by a processor to receive a configuration for TDM of sensing signals in a shared radio frequency spectrum band, identify, from the configuration, an inter-pulse interval between a first sensing signal pulse and a second sensing signal pulse, determine whether to retune a radio frequency chain of the UE for wireless communications during the inter-pulse interval based on a duration of the inter-pulse interval and the configuration, and perform wireless communications either during the inter-pulse interval or outside of the inter-pulse interval based on the determination.

In some examples of the method, apparatuses, and non-transitory computer-readable medium described herein, determining whether to retune the radio frequency chain of the UE may include operations, features, means, or instructions for determining that the duration of the inter-pulse interval satisfies a threshold, where performing wireless communications during the inter-pulse interval may be based on the duration of the inter-pulse interval satisfying the threshold.

In some examples of the method, apparatuses, and non-transitory computer-readable medium described herein, determining whether to retune the radio frequency chain of the UE may include operations, features, means, or instructions for determining that the duration of the inter-pulse interval fails to satisfy a threshold, where performing wireless communications outside of the inter-pulse interval may be based on the duration of the inter-pulse interval failing to satisfy the threshold.

Some examples of the method, apparatuses, and non-transitory computer-readable medium described herein may further include operations, features, means, or instructions for retuning the radio frequency chain from the first sensing signal pulse to wireless communications during a first retuning gap, and retuning the radio frequency chain from wireless communications to the second sensing signal pulse during a second retuning gap.

Some examples of the method, apparatuses, and non-transitory computer-readable medium described herein may further include operations, features, means, or instructions for receiving, from a base station, an indication of the first retuning gap and the second retuning gap.

Some examples of the method, apparatuses, and non-transitory computer-readable medium described herein may further include operations, features, means, or instructions for determining the first retuning gap and the second retuning gap based on a pre-configured rule of the UE.

Some examples of the method, apparatuses, and non-transitory computer-readable medium described herein may further include operations, features, means, or instructions for determining the first retuning gap and the second retuning gap based on a capability of the UE.

Some examples of the method, apparatuses, and non-transitory computer-readable medium described herein may further include operations, features, means, or instructions for transmitting, to a base station, an indication of the capability of the UE.

In some examples of the method, apparatuses, and non-transitory computer-readable medium described herein, the first retuning gap may be longer than the second retuning gap.

In some examples of the method, apparatuses, and non-transitory computer-readable medium described herein, the first retuning gap may be three milliseconds or three slots.

In some examples of the method, apparatuses, and non-transitory computer-readable medium described herein, the second retuning gap may be zero milliseconds or zero slots.

A method of wireless communications at a UE is described. The method may include receiving a configuration for TDM of sensing signals in a shared radio frequency spectrum band, determining, based on the configuration, a phase and amplitude continuity status of at least two adjacent sensing signal pulses, where the phase and amplitude continuity status is indicative of a phase and amplitude continuity of the at least two adjacent sensing signal pulses, and participating in sensing operations that include the at least two adjacent sensing signal pulses based on the phase and amplitude continuity status and the configuration.

An apparatus for wireless communications at a UE is described. The apparatus may include a processor, memory coupled with the processor, and instructions stored in the memory. The instructions may be executable by the processor to cause the apparatus to receive a configuration for TDM of sensing signals in a shared radio frequency spectrum band, determine, based on the configuration, a phase and amplitude continuity status of at least two adjacent sensing signal pulses, where the phase and amplitude continuity status is indicative of a phase and amplitude continuity of the at least two adjacent sensing signal pulses, and participate in sensing operations that include the at least two adjacent sensing signal pulses based on the phase and amplitude continuity status and the configuration.

Another apparatus for wireless communications at a UE is described. The apparatus may include means for receiving a configuration for TDM of sensing signals in a shared radio frequency spectrum band, determining, based on the configuration, a phase and amplitude continuity status of at least two adjacent sensing signal pulses, where the phase and amplitude continuity status is indicative of a phase and amplitude continuity of the at least two adjacent sensing signal pulses, and participating in sensing operations that include the at least two adjacent sensing signal pulses based on the phase and amplitude continuity status and the configuration.

A non-transitory computer-readable medium storing code for wireless communications at a UE is described. The code may include instructions executable by a processor to receive a configuration for TDM of sensing signals in a shared radio frequency spectrum band, determine, based on the configuration, a phase and amplitude continuity status of at least two adjacent sensing signal pulses, where the phase and amplitude continuity status is indicative of a phase and amplitude continuity of the at least two adjacent sensing signal pulses, and participate in sensing operations that include the at least two adjacent sensing signal pulses based on the phase and amplitude continuity status and the configuration.

Some examples of the method, apparatuses, and non-transitory computer-readable medium described herein may further include operations, features, means, or instructions for determining a capability of the UE for the at least two adjacent sensing signal pulses to may have phase and amplitude continuity, where the phase and amplitude continuity status of the at least two adjacent sensing signal pulses may be based on the capability of the UE, and transmitting, to a base station, the capability of the UE.

In some examples of the method, apparatuses, and non-transitory computer-readable medium described herein, the capability of the UE for the at least two adjacent sensing signal pulses to may have phase and amplitude continuity may be based on one or both of an inter-pulse interval between the at least two adjacent sensing signal pulses and a presence of wireless communications between the at least two adjacent sensing signal pulses.

Some examples of the method, apparatuses, and non-transitory computer-readable medium described herein may further include operations, features, means, or instructions for performing wireless communications between the at least two adjacent sensing signal pulses.

In some examples of the method, apparatuses, and non-transitory computer-readable medium described herein, determining the phase and amplitude continuity status of the at least two adjacent sensing signal pulses may include operations, features, means, or instructions for determining the phase and amplitude continuity status of the at least two adjacent sensing signal pulses based on performing wireless communications between the at least two adjacent sensing signal pulses and one or more parameters of wireless communications.

In some examples of the method, apparatuses, and non-transitory computer-readable medium described herein, the one or more parameters of wireless communications include one or more of a transmit power of wireless communications, a bandwidth of wireless communications, a waveform of wireless communications, a duration of wireless communications, and a time difference between wireless communications and a next sensing signal pulse.

In some examples of the method, apparatuses, and non-transitory computer-readable medium described herein, determining the phase and amplitude continuity status of the at least two adjacent sensing signal pulses may include operations, features, means, or instructions for determining, based on the configuration, the phase and amplitude continuity status of a set of adjacent sensing signal pulses, where the set of adjacent sensing signal pulses includes the at least two adjacent sensing signal pulses.

A method of wireless communications at a base station is described. The method may include identifying an inter-pulse interval between a first sensing signal pulse and a second sensing signal pulse, transmitting, to a UE, a configuration for TDM of sensing signals with wireless communications with the UE within a shared spectrum, the configuration including the inter-pulse interval between the first sensing signal pulse and the second sensing signal pulse, and performing wireless communications with the UE either during the inter-pulse interval or outside of the inter-pulse interval based on a duration of the inter-pulse interval.

An apparatus for wireless communications at a base station is described. The apparatus may include a processor, memory coupled with the processor, and instructions stored in the memory. The instructions may be executable by the processor to cause the apparatus to identify an inter-pulse interval between a first sensing signal pulse and a second sensing signal pulse, transmit, to a UE, a configuration for TDM of sensing signals with wireless communications with the UE within a shared spectrum, the configuration including the inter-pulse interval between the first sensing signal pulse and the second sensing signal pulse, and perform wireless communications with the UE either during the inter-pulse interval or outside of the inter-pulse interval based on a duration of the inter-pulse interval.

Another apparatus for wireless communications at a base station is described. The apparatus may include means for identifying an inter-pulse interval between a first sensing signal pulse and a second sensing signal pulse, transmitting, to a UE, a configuration for TDM of sensing signals with wireless communications with the UE within a shared spectrum, the configuration including the inter-pulse interval between the first sensing signal pulse and the second sensing signal pulse, and performing wireless communications with the UE either during the inter-pulse interval or outside of the inter-pulse interval based on a duration of the inter-pulse interval.

A non-transitory computer-readable medium storing code for wireless communications at a base station is described. The code may include instructions executable by a processor to identify an inter-pulse interval between a first sensing signal pulse and a second sensing signal pulse, transmit, to a UE, a configuration for TDM of sensing signals with wireless communications with the UE within a shared spectrum, the configuration including the inter-pulse interval between the first sensing signal pulse and the second sensing signal pulse, and perform wireless communications with the UE either during the inter-pulse interval or outside of the inter-pulse interval based on a duration of the inter-pulse interval.

Some examples of the method, apparatuses, and non-transitory computer-readable medium described herein may further include operations, features, means, or instructions for determining that the duration of the inter-pulse interval satisfies a threshold, where performing wireless communications with the UE during the inter-pulse interval may be based on the duration of the inter-pulse interval satisfying the threshold.

Some examples of the method, apparatuses, and non-transitory computer-readable medium described herein may further include operations, features, means, or instructions for determining that the duration of the inter-pulse interval fails to satisfy a threshold, where performing wireless communications with the UE outside of the inter-pulse interval may be based on the duration of the inter-pulse interval failing to satisfy the threshold.

Some examples of the method, apparatuses, and non-transitory computer-readable medium described herein may further include operations, features, means, or instructions for transmitting, to the UE, an indication of a first retuning gap for retuning a radio frequency chain of the UE from the first sensing signal pulse to wireless communications and a second retuning gap for retuning the radio frequency chain of the UE from wireless communications to the second sensing signal pulse.

In some examples of the method, apparatuses, and non-transitory computer-readable medium described herein, the first retuning gap may be longer than the second retuning gap.

In some examples of the method, apparatuses, and non-transitory computer-readable medium described herein, the first retuning gap may be three milliseconds or three slots.

In some examples of the method, apparatuses, and non-transitory computer-readable medium described herein, the second retuning gap may be zero milliseconds or zero slots.

A method of wireless communications at a base station is described. The method may include determining a phase and amplitude continuity status of at least two adjacent sensing signal pulses, where the phase and amplitude continuity status is indicative of the at least two adjacent sensing signal pulses either having phase and amplitude continuity or not having phase and amplitude continuity, transmitting, to a UE, a configuration for TDM of sensing signals with wireless communications with the UE within a shared spectrum, the configuration including the phase and amplitude continuity status of the at least two adjacent sensing signal pulses, and participating in sensing operations that include the at least two adjacent sensing signal pulses based on the phase and amplitude continuity status.

An apparatus for wireless communications at a base station is described. The apparatus may include a processor, memory coupled with the processor, and instructions stored in the memory. The instructions may be executable by the processor to cause the apparatus to determine a phase and amplitude continuity status of at least two adjacent sensing signal pulses, where the phase and amplitude continuity status is indicative of the at least two adjacent sensing signal pulses either having phase and amplitude continuity or not having phase and amplitude continuity, transmit, to a UE, a configuration for TDM of sensing signals with wireless communications with the UE within a shared spectrum, the configuration including the phase and amplitude continuity status of the at least two adjacent sensing signal pulses, and participate in sensing operations that include the at least two adjacent sensing signal pulses based on the phase and amplitude continuity status.

Another apparatus for wireless communications at a base station is described. The apparatus may include means for determining a phase and amplitude continuity status of at least two adjacent sensing signal pulses, where the phase and amplitude continuity status is indicative of the at least two adjacent sensing signal pulses either having phase and amplitude continuity or not having phase and amplitude continuity, transmitting, to a UE, a configuration for TDM of sensing signals with wireless communications with the UE within a shared spectrum, the configuration including the phase and amplitude continuity status of the at least two adjacent sensing signal pulses, and participating in sensing operations that include the at least two adjacent sensing signal pulses based on the phase and amplitude continuity status.

A non-transitory computer-readable medium storing code for wireless communications at a base station is described. The code may include instructions executable by a processor to determine a phase and amplitude continuity status of at least two adjacent sensing signal pulses, where the phase and amplitude continuity status is indicative of the at least two adjacent sensing signal pulses either having phase and amplitude continuity or not having phase and amplitude continuity, transmit, to a UE, a configuration for TDM of sensing signals with wireless communications with the UE within a shared spectrum, the configuration including the phase and amplitude continuity status of the at least two adjacent sensing signal pulses, and participate in sensing operations that include the at least two adjacent sensing signal pulses based on the phase and amplitude continuity status.

Some examples of the method, apparatuses, and non-transitory computer-readable medium described herein may further include operations, features, means, or instructions for receiving, from the UE, a capability of the UE for the at least two adjacent sensing signal pulses to may have phase and amplitude continuity, where the phase and amplitude continuity status may be based on the capability of the UE for the at least two adjacent sensing signal pulses to may have phase and amplitude continuity.

In some examples of the method, apparatuses, and non-transitory computer-readable medium described herein, the capability of the UE for the at least two adjacent sensing signal pulses to may have phase and amplitude continuity may be based on one or both of an inter-pulse interval between the at least two adjacent sensing signal pulses and a presence of wireless communications between the at least two adjacent sensing signal pulses.

Some examples of the method, apparatuses, and non-transitory computer-readable medium described herein may further include operations, features, means, or instructions for performing wireless communications with the UE between the at least two adjacent sensing signal pulses.

In some examples of the method, apparatuses, and non-transitory computer-readable medium described herein, determining the phase and amplitude continuity status of the at least two adjacent sensing signal pulses may include operations, features, means, or instructions for determining the phase and amplitude continuity status of the at least two adjacent sensing signal pulses based on performing wireless communications with the UE between the at least two adjacent sensing signal pulses and one or more parameters of wireless communications.

In some examples of the method, apparatuses, and non-transitory computer-readable medium described herein, the one or more parameters of wireless communications include one or more of a transmit power of wireless communications, a bandwidth of wireless communications, a waveform of wireless communications, a duration of wireless communications, and a time difference between wireless communications and a next sensing signal pulse.

In some examples of the method, apparatuses, and non-transitory computer-readable medium described herein, determining the phase and amplitude continuity status of the at least two adjacent sensing signal pulses may include operations, features, means, or instructions for determining the phase and amplitude continuity status of a set of adjacent sensing signal pulses, where the set of adjacent sensing signal pulses includes the at least two adjacent sensing signal pulses.

DETAILED DESCRIPTION

Figure 1:
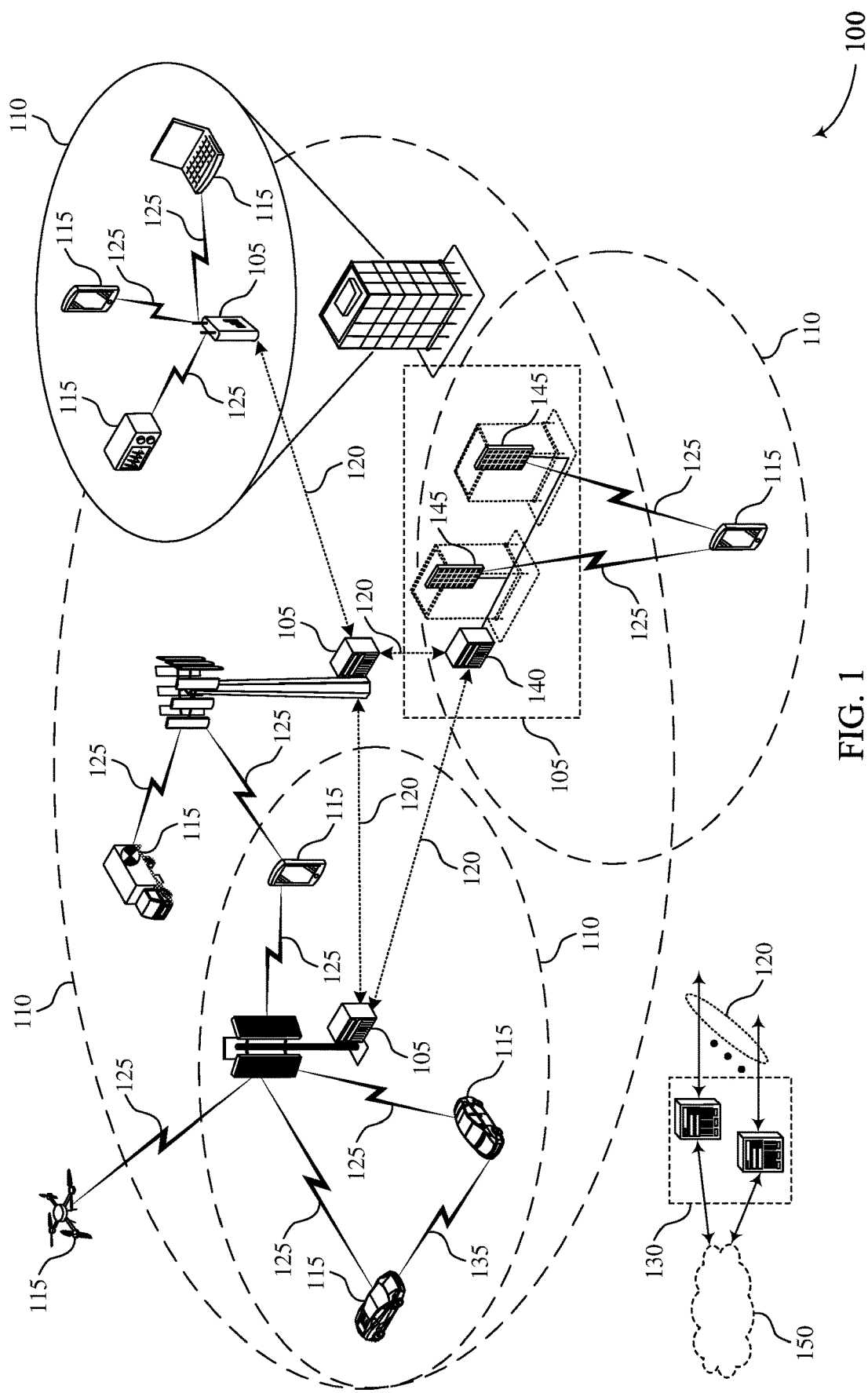
FIGS. 1 through 3 illustrate examples of wireless communications systems that supports configuring a retuning gap and amplitude and phase continuity for sensing and wireless communications in accordance with aspects of the present disclosure.

In some wireless communications systems, a base station or a user equipment (UE), or both, may perform sensing operations using sensing signals, such as radar signals, to determine a location or a presence of one or more objects. For instance, in examples in which the UE is a vehicle, the UE may use radar signals to detect the presence of other vehicles, pedestrians, buildings, or any other objects whose known location or presence may result in more optimal driving decisions. In some cases, the radar signals that may be used for object detection may experience interference from other nearby devices that are also using radar signals. To help avoid such interference, communication signals (e.g., wireless communications) may be communicated between the devices to manage or otherwise coordinate the use of radar signals. Such use of communication signals to control sensing signals may be referred to as joint sensing and communication. Further, in some cases, the base station and the UE may support multi-node cooperative passive sensing to achieve better angular resolution, greater spatial diversity, and better identifiability of sensing signals.

In such systems, communication signals and sensing signals may be multiplexed using space-division multiplexing (SDM), frequency division multiplexing (FDM), or time division multiplexing (TDM). In some cases, however, such as in cases in which the base station and the UE employ TDM of the communication signals and sensing signals, transmitting or receiving communication signals and sensing signals at successive instances in time may result in a sub-optimal tuning of a radio frequency chain of the UE based on unbalanced operation points of a power amplifier of the UE. For example, sensing signals may have a smaller peak-to-average-power ratio (PAPR) and may operate nearer a non-linear regime of an input voltage (Vin) to output voltage (Vout) curve, while communication signals may have a larger PAPR and may operate farther away from the non-linear regime of the Vin to Vout curve. As such, the UE may spend a longer duration retuning the radio frequency chain for communication signals than for sensing signals to compensate for the greater PAPR of communication signals. Additionally, or alternatively, the phase and amplitude of two adjacent or consecutive sensing signals may be discontinuous based on the non-linearities of the Vin to Vout curve or based on the presence of a communication signal between the two consecutive sensing signals.

In some implementations of the present disclosure, the base station may configure the UE to use a greater retuning gap (e.g., a longer time duration during which the UE may retune the radio frequency chain of the UE) prior to transmitting or receiving a communication signal than the UE may use prior to transmitting or receiving a sensing signal. As such, the UE may more optimally retune the radio frequency chain of the UE (e.g., retune the radio frequency chain farther away from the non-linear regime of the Vin to Vout curve) prior to transmitting or receiving a communication signal. In some examples, the UE may use the configured retuning gaps to determine whether to transmit or receive a communication signal between two consecutive sensing signals. For example, the UE may determine whether an inter-pulse interval between two consecutive sensing signals is sufficiently long to include a first retuning gap for transitioning from the first sensing signal to the communication signal and a second retuning gap for transitioning from the communication signal to the second sensing signal.

In some other implementations of the present disclosure, the base station may configure the UE with an indication of whether multiple consecutive sensing signals have continued phase and amplitude. The configuration from the base station may include a phase and amplitude continuity status and the UE may determine whether the multiple consecutive sensing signals have continued phase and amplitude based on the phase and amplitude continuity status. In some examples, the base station may determine the phase and amplitude continuity status without signaling or input from the UE. In some other examples, the base station may determine the phase and amplitude continuity status based on receiving signaling from the UE indicating a capability of the UE for transmitting or receiving the multiple sensing signals with continued phase and amplitude. In some aspects, the capability of the UE may be based on the inter-pulse interval between the multiple sensing signals or based on the presence of a communication signal between the multiple sensing signals.

Particular aspects of the subject matter described herein may be implemented to realize one or more potential advantages. The described techniques may be implemented to more optimally configure retuning gaps at the UE based on configuring the retuning gaps based on which signals the UE is transitioning between. For example, the base station may configure a longer retuning gap for the UE to use when transitioning from a sensing signal to a communication signal and a shorter retuning gap for the UE to use when transitioning from a communication signal to a sensing signal, which may achieve a balance between increasing the likelihood for successful communication and latency. For example, based on using a longer retuning gap when transitioning from a sensing signal to a communication signal, the UE may retune the radio frequency chain of the UE farther away from the non-linear regime of the Vin to Vout curve, which may increase the likelihood for successful reception of the communication signal, and based on using a shorter retuning gap when transitioning between a communication signal and a sensing signal, the UE may reduce latency for transmitting a sensing signal. Further, based on determining whether to transmit or receive a communication signal between two sensing signals based on the configured retuning gaps and determining which sets of sensing signals have continued phase and amplitude, the UE may experience other service enhancements associated with more optimal object detection and more successful wireless communications.

Aspects of the disclosure are initially described in the context of wireless communications systems. Aspects of the disclosure are additionally described in the context of a communication timeline and process flows. Aspects of the disclosure are further illustrated by and described with reference to apparatus diagrams, system diagrams, and flowcharts that relate to configuring a retuning gap and amplitude and phase continuity for sensing and wireless communications.

FIG. 1 illustrates an example of a wireless communications system 100 that supports configuring a retuning gap and amplitude and phase continuity for sensing and wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of TDM techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless communications system 100 may support joint sensing and communication operations such that the base stations 105 and the UEs 115 may manage sensing operations (e.g., coordinate the use of sensing signals, such as radar signals, among a number of different devices) by transmitting or receiving wireless communications. For example, based on implementing joint sensing and communication, a base station 105 and a UE 115 may experience more reliable sensing performance based on fusion, feedback, and information exchange facilitated via wireless communications. Further, in some examples, the wireless communications system 100 may support multi-node passive sensing. For example, a UE 115 may participate in a sensing operation with a base station 105 by receiving sensing signals transmitted from the base station 105. In other words, a first node (e.g., the base station 105) may transmit a sensing signal and a second node (e.g., the UE 115) may receive the sensing signal. Such passive sensing may differ from active sensing in which a UE 115 may both transmit and receive a sensing signal. In some cases, a base station 105 and a UE 115 may communicate sensing signals and wireless communications in a shared radio frequency spectrum and may employ TDM techniques to multiplex sensing signals with wireless communications within the shared radio frequency spectrum.

A base station 105 may transmit a configuration for the TDM of sensing signals with wireless communications within the shared spectrum to a UE 115 and, in some implementations of the present disclosure, may additionally configure the UE 115 with an inter-pulse interval between two adjacent or consecutive sensing signals (e.g., between two sensing signal pulses) and configure the UE with multiple retuning gaps that the UE 115 may use when retuning a radio frequency chain of the UE 115. In some examples, the base station 105 may configure the retuning gaps at the UE 115 based on a transition from transmitting or receiving one type of signaling to transmitting or receiving a different type of signaling. For example, the base station 105 may configure a first retuning gap that the UE 115 may use when transitioning from a sensing signal to a communication signal and may configure a second retuning gap that the UE 115 may use when transitioning from a communication signal to a sensing signal.

In some examples, the UE 115 may identify that the inter-pulse interval is a time duration between a first sensing signal pulse and a second sensing signal pulse based on the configuration and may determine whether to perform wireless communications (e.g., transmit or receive one or more communication signals) during the inter-pulse interval or outside of the inter-pulse interval based on the time duration of the inter-pulse interval, a time duration of the first retuning gap, and a time duration of the second retuning gap. For example, the UE 115 may determine whether the inter-pulse interval is sufficiently long to enable the UE 115 to retune the radio frequency chain of the UE 115 according to the first retuning gap and the second retuning gap. In other words, the UE 115 may determine whether the inter-pulse interval is sufficiently long to enable the UE 115 to transition from transmitting or receiving the first sensing signal pulse to performing wireless communications and to transition from performing wireless communications to transmitting or receiving the second sensing signal pulse.

In addition or as an alternative to configuring the UE 115 with the inter-pulse interval between two consecutive sensing signals and the multiple retuning gaps, the base station 105 may include an indication of a phase and amplitude continuity status of at least two consecutive or adjacent sensing signal pulses in the configuration for the TDM of sensing signals with wireless communications. The phase and amplitude continuity status of the multiple consecutive or adjacent sensing signal pulses may indicate that the multiple sensing signal pulses have phase and amplitude continuity (e.g., each of the multiple sensing signal pulses have the same phase and amplitude) or that the multiple sensing signal pulses do not have phase and amplitude continuity (e.g., the multiple sensing signal pulses do not all have the same phase and amplitude). The UE 115, based on identifying the phase and amplitude continuity status, may transmit or receive the multiple sensing signal pulses accordingly.

Figure 2:
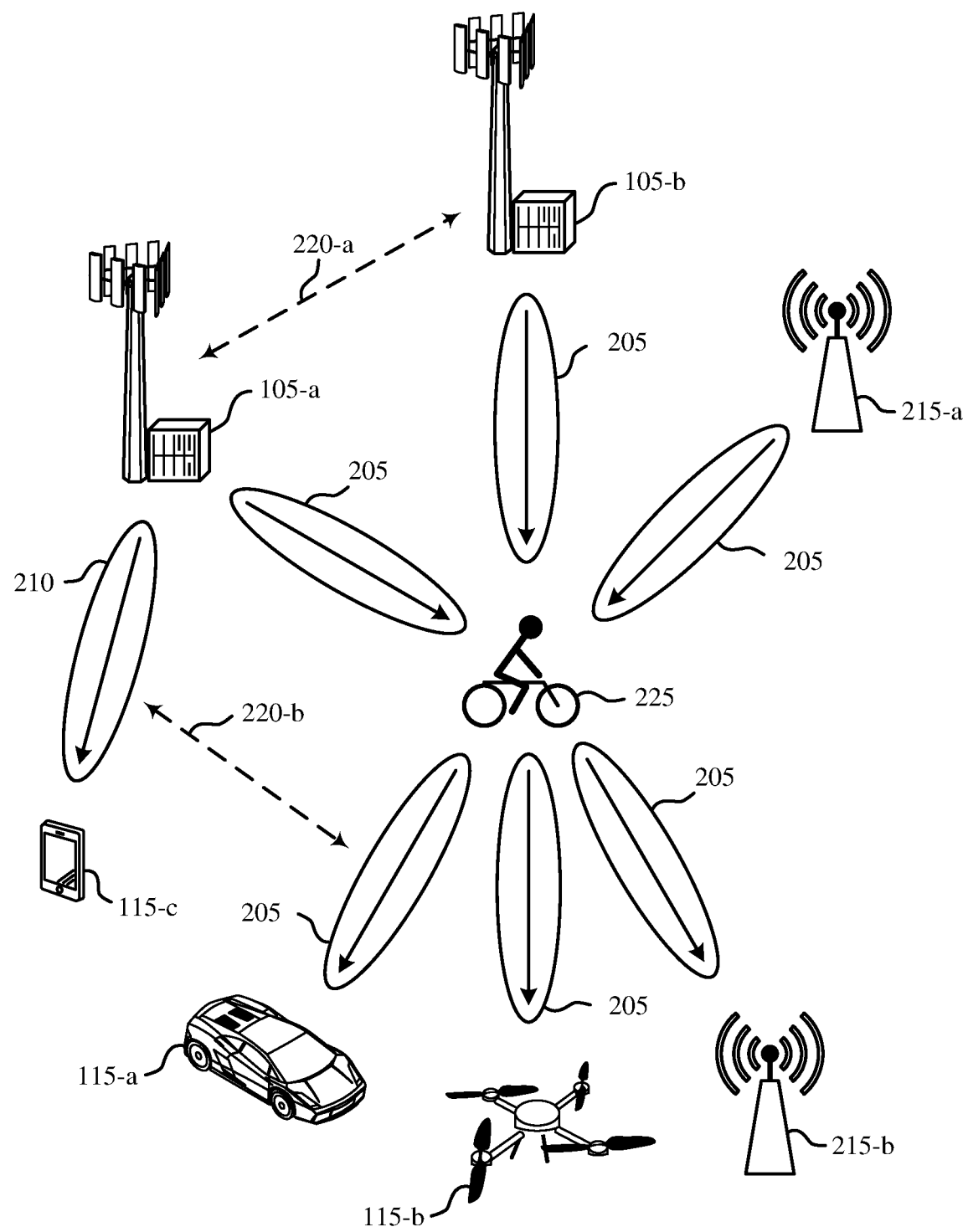

FIG. 2 illustrates an example of a wireless communications system 200 that supports configuring a retuning gap and amplitude and phase continuity for sensing and wireless communications in accordance with aspects of the present disclosure. In some examples, the wireless communications system 200 may implement aspects of the wireless communications system 100. The wireless communications system 200 may illustrate a number of base stations 105, UEs 115, and nodes 215, which may be examples of corresponding devices described herein, that may participate in multi-node cooperative passive sensing operations. In some implementations, the base station 105-a, the base station 105-b, or the node 215-a may configure the UE 115-a, the UE 115-b, or the node 215-b with an inter-pulse interval between two consecutive sensing signals 205 and with multiple retuning gaps and the UE 115-a, the UE 115-b, or the node 215-b may determine to perform wireless communications between the two consecutive sensing signals 205 based on a time duration of the inter-pulse interval and time durations of the multiple retuning gaps. In some other implementations, the base station 105-a, the base station 105-b, or the node 215-a may configure the UE 115-a, the UE 115-b, or the node 215-b with a phase and amplitude continuity status of multiple sensing signals 205.

In some cases, a device, such as a base station 105, a UE 115, or a node 215, may perform sensing operations to detect the location or the presence of an object 225 by transmitting one or more sensing signals 205, such as radar signals, that may reflect off of the object 225. The device may receive the reflected sensing signals 205 at a receiver of the device and determine the location or the presence of the object 225 based on receiving the reflected sensing signals 205. Such sensing operations in which the device transmits and receives sensing signals 205 may be referred to as active sensing. In some cases, such active sensing operations may generate self-interference. For example, a transmission of a sensing signal from the device may generate self-interference at the receiver of the device in examples in which the transmitter and the receiver of the device are located near each other (e.g., collocated) or otherwise poorly insulated from each other. In cases in which the transmitter and the receiver of the device are located in the same or in proximate locations, the device may have a limited transmission power, the transmissions from the device may be rate-limited, and the device may have a poor angular resolution. Further, multiple devices may similarly perform such active sensing operations by transmitting and receiving sensing signals 205, which may result in inter-*d*evice or inter-sensor interference 220-a (e.g., a sensing signal 205 transmitted from one device may be generate interference 220 at a receiver of another device).

Additionally, the device may perform wireless communications 210 with one or more other devices, and such wireless communications may non-cooperatively co-exist with sensing signals 205. For instance, the device may use a finite resource allocation or spectrum, such as a shared spectrum, for sensing signals 205 and wireless communications 210, which may result in spectrum congestion. Further, in some cases, wireless communications 210 between two devices may cause interference 220-b that may adversely affect a sensing signal 205. Such inter-service interference 220-b, like self-interference or inter-sensor interference 220-a, may unpredictably interfere with sensing signals 205, which may result in an erroneous or a sub-optimal determination of the presence or location of an object 225. In some cases, such as in cases in which the device is a vehicle or a drone, such erroneous information on the presence or location of an object 225 may result in sub-optimal driving assistance decisions. Additionally, or alternatively, active sensing operations may lack quality of service (QOS) guarantees for high-resolution sensing operations and may be associated with low angular resolution and low spatial diversity because the device may feature a limited beamforming capability and limited separation between transmit and receive antennas.

To assist in mitigating or otherwise controlling interference 220, enabling a higher QoS guarantee, and to provide fusion, feedback, or information exchange that may improve the performance of the sensing operations, the device may support a joint sensing and communications air interface. In some aspects, such a joint sensing and communications air interface may feature licensed bands, such that the device may use one licensed band for sensing signals 205, another licensed band for wireless communications 210, or use a single licensed band for both sensing signals 205 and wireless communications 210. In examples in which the device employs a joint sensing and communications air interface, the sensing signals 205 and the wireless communications 210 may share similar service coverage, the QoS of the sensing signals 205 may be associated with a greater guarantee (e.g., when used in licensed bands), the interference 220 experienced by the sensing signals 205 and the wireless communications 210 may be managed or controlled, and the performance of a sensing operation may be improved via the wireless communications 210 (e.g., sensing operations may result in more accurate object 225 detection based on fusion, feedback, and information exchange facilitated by the wireless communications 210).

Additionally, in some examples, such joint sensing and communications may be performed in the context of multi-node cooperative passive sensing in which the location of the transmission of a sensing signal 205 is different than the location of the reception of the sensing signal 205. Such use of passive sensing may achieve greater angular resolution, greater spatial diversity, and improved identifiability as compared to a single node active sensing operation. For example, a base station 105-a, a base station 105-b, or a node 215-a may transmit a sensing signal 205 and a UE 115-a, a UE 115-b, or a node 215-b may receive the sensing signal 205. In such systems, the base station 105-a, the base station 105-b, and the node 215-a may be synchronized with the UE 115-a, the UE 115-b, and the node 215-b to enable the successful reception of sensing signals at the UE 115-a, the UE 115-b, and the node 215-b that were transmitted from the base station 105-a, the base station 105-b, and the node 215-a.

In some examples, the base station 105-a, the base station 105-b, and the node 215-a may have a greater beamforming capability than the UE 115-a, the UE 115-b, or the node 215-b, which may provide for the greater angular resolution as compared to single node active sensing, and the separation of the transmission point of the sensing signal 205 and the reception point of the sensing signal 205 may provide for the greater spatial diversity as compared to single node active sensing. Further, in some cases, the wireless communications system 200 may achieve improved identifiability via cooperative fusion of sensing signals 205 with assistance from wireless communications 210 (e.g., with help from communication links). In some aspects, wireless communications 210 may be reused for sensing signals 205, which may reduce overhead and, accordingly, increase spectral efficiency.

The wireless communications 210 and the sensing signals 205 may use the same or different waveforms. In some cases, the wireless communications 210 may use OFDM waveforms and the sensing signals 205 may use radar waveforms. In some other cases, both the wireless communications 210 and the sensing signals 205 may use OFDM waveforms. In some other cases, both the wireless communications 210 and the sensing signals 205 may use low PAPR radar waveforms, such as pulse-based waveforms, frequency modulated continuous wave (FMCW) waveforms, or bi-phase modulated continuous wave (PMCW) waveforms.

In examples in which the wireless communications system 200 employs joint sensing and communications, the wireless communications 210 and the sensing signals 205 may be multiplexed in a shared spectrum. In some cases, the wireless communications 210 and the sensing signals 205 may be multiplexed according to a space-division multiplexing (SDM) technique. In such cases, the wireless communications 210 and the sensing signals 205 may be spatially selective and spectrum utilization may be more balanced compared to other multiplexing techniques. Further, devices in the wireless communications system 200 may employ massive MIMO and mmW technologies (e.g., such as those in NR) to mitigate spatial interference. In some cases, however, SDM techniques may result in residual interference at a less-prioritized system, which may affect the performance of the less-prioritized system. For example, a device in the wireless communications system 200 may prioritize either wireless communications 210 or sensing signals 205 and may accordingly avoid interference 220 towards the prioritized signaling. In some cases, the device may prioritize sensing signals 205 for collision avoidance or prioritize wireless communications 210 for sensing assisted communication. In some other cases, the wireless communications 210 and the sensing signals 205 may be multiplexed according to a TDM technique or an FDM technique. In such cases, devices in the wireless communications system 200 may have greater control of interference 220 but may experience affected or limited Doppler or range resolution and greater scheduling restrictions on communications as compared to SDM.

In some cases, the wireless communications 210 and the sensing signals 205 may be associated with different or unbalanced power amplifier operation points. For example, a device may transmit sensing signals 205 with a higher transmission power (e.g., a greater Vin and Vout than used for transmitting wireless communications 210) using a low-PAPR radar waveform. On the other hand, the device may transmit wireless communications 210 with a lower transmission power (e.g., a lower Vin and Vout than used for transmitting sensing signals 205) using a higher PAPR waveform (such as an OFDM waveform, which may result in greater spectrum efficiency). As such, the power amplifier of the device may operate relatively nearer to a non-linear regime of a Vin to Vout curve when transmitting the sensing signals 205 and relatively farther from the non-linear regime of the Vin to Vout curve when transmitting wireless communications 210. Accordingly, there may be greater complexity when retuning a radio frequency chain of the device to compensate for the power amplifier non-linearity prior to transmitting wireless communications 210 than prior to transmitting sensing signals 205 and the device may use a longer duration to retune the radio frequency chain of the device prior to transmitting wireless communications 210 than prior to transmitting sensing signals 205 based on the greater complexity. In some implementations of the present disclosure, the device may be configured with a different retuning gap based on whether the device is transitioning from transmitting or receiving sensing signals 205 to transmitting or receiving wireless communications 210 or transitioning from transmitting or receiving wireless communications 210 to transmitting or receiving sensing signals 205 (e.g., in examples in which wireless communications 210 and sensing signals 205 are multiplexed according to a TDM technique). Additional details relating to configuring the retuning gaps at the device are described herein, including with reference to FIGS. 3 and 4.

Additionally, or alternatively, the power amplifier of the device transmitting the sensing signals 205 may not remain the same over multiple sensing signal pulses. For example, based on the non-linearity of the Vin to Vout curve, the power amplifier may, in some cases, transmit two consecutive sensing signals 205 with different phase and amplitudes, which may adversely impact a capability of a receiving device to accurately interpret one or both of the received sensing signals 205. The variation in the phase and amplitude between two consecutive sensing signals 205 may be based on a bandwidth of the signaling transmitted from the power amplifier and based on whether wireless communications 210 are transmitted between the two consecutive sensing signals 205. In some implementations of the present disclosure, the device may be configured with a phase and amplitude continuity status that indicates whether multiple sensing signals 205 have continued (e.g., the same) phase and amplitude. Additional details relating to configuring the phase and amplitude continuity status are described herein, including with reference to FIG. 3.

Figure 3:
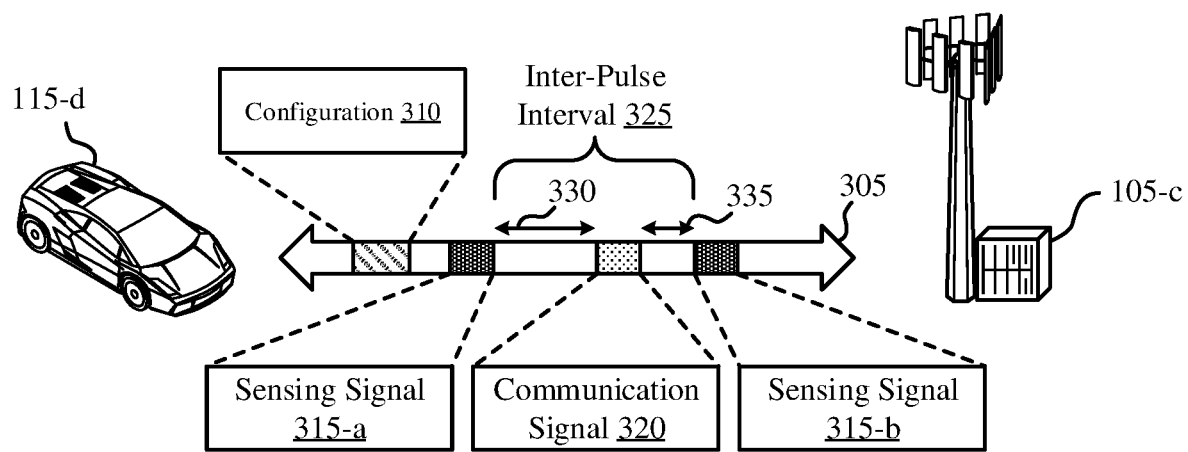

FIG. 3 illustrates an example of a wireless communications system 300 that supports configuring a retuning gap and amplitude and phase continuity for sensing and wireless communications in accordance with aspects of the present disclosure. In some examples, the wireless communications system 300 may implement aspects of the wireless communications system 100 and the wireless communications system 200. The wireless communications system 300 illustrates signaling between a base station 105-c and a UE 115-d, which may be examples of corresponding devices described herein, over a communication link 305. In some cases, the communication link 305 may be an example of a shared spectrum over which the base station 105-c and the UE 115-d may communicate communication signals 320 (e.g., wireless communications) and sensing signals 315 according to a TDM technique. The base station 105-c may transmit a configuration 310 to the UE 115-d for TDM of sensing signals 315 and communication signals 320 within the shared spectrum.

In some implementations, the configuration 310 may indicate an inter-pulse interval 325 between a sensing signal 315-a and a sensing signal 315-b, which may be two consecutive or adjacent sensing signals 315. Although described herein as sensing signals 315, the sensing signals 315 may be equivalently referred to as sensing signal pulses (e.g., the term sensing signal and sensing signal pulse may be used interchangeably herein). In some aspects, the inter-pulse interval 325 may correspond to a time duration from the end of the sensing signal 315-a to the beginning of the sensing signal 315-b. In some cases, the base station 105-c may transmit the sensing signals 315 to the UE 115-d as part of a multi-node cooperative passive sensing operation.

In some examples, the configuration 310 may also include an indication of a retuning gap 330 and a retuning gap 335 during which the UE 115-d may retune a radio frequency chain of the UE 115-d. In some other examples, the UE 115-d may identify the retuning gap 330 and the retuning gap 335 independently of the configuration 310. For example, the UE 115-d may identify the retuning gap 330 and the retuning gap 335 based on a pre-configured rule of the UE 115-d, such as a rule defined in a specification. In some other examples, the UE 115-d may determine the retuning gap 330 and the retuning gap 335 based on a capability of the UE 115-d. For example, the UE 115-d may determine a duration of the retuning gap 330 and a duration of the retuning gap 335 based on the capability of the UE 115-d to retune the radio frequency chain of the UE 115-d (e.g., based on the rate at which the UE 115-d may retune the radio frequency chain of the UE 115-d or based on the amount of retuning the UE 115-d may perform, or both). In examples in which the UE 115-d determines the retuning gap 330 and the retuning gap 335 based on the capability of the UE 115-d, the UE 115-d may transmit an indication of the capability of the UE 115-d to the base station 105-c.

In some implementations, the retuning gap 330 may be an example of a retuning gap that the UE 115-d may use to retune the radio frequency chain of the UE 115-d when transitioning from transmitting or receiving a sensing signal 315-a to transmitting or receiving a communication signal 320 and the retuning gap 335 may be an example of a retuning gap that the UE 115-d may use to retune the radio frequency chain of the UE 115-d when transitioning from transmitting or receiving a communication signal 320 to transmitting or receiving a sensing signal 315-b. In some examples, the retuning gap 330 that the UE 115-d may employ when transitioning between transmitting or receiving a sensing signal 315-a to transmitting or receiving a communication signal 320 may be longer than the retuning gap 335 that the UE 115-d may employ when transitioning between transmitting or receiving a communication signal 320 to transmitting or receiving a sensing signal 315-b based on the added complexity associated with retuning the radio frequency chain of the UE 115-d prior to transmitting or receiving a communication signal 320 (e.g., based on the relatively farther distance of the power amplifier operation point from the non-linear regime of the Vin to Vout curve when transmitting a communication signal 320 compared to transmitting a sensing signal 315). In some specific examples, the retuning gap 330 may be three milliseconds or three slots from the end of transmitting or receiving the sensing signal 315-a to transmitting or receiving the communication signal 320 and the retuning gap 335 may be zero milliseconds or zero slots from the end of transmitting or receiving the communication signal 320 to transmitting or receiving the sensing signal 315-b (e.g., the communication signal 320 and the sensing signal 315-a may be transmitted or received back-to-back).

Upon determining the retuning gap 330 and the retuning gap 335, the UE 115-d may determine whether to retune the radio frequency chain of the UE 115-d for transmitting or receiving the communication signal 320 during the inter-pulse interval 325 based on the duration of the inter-pulse interval 325. In other words, the UE 115-d may determine whether to transmit or receive the communication signal 320 during the inter-pulse interval 325 based on whether the inter-pulse interval 325 is sufficiently long to enable the UE 115-d to perform retuning during the retuning gap 330 and the retuning gap 335 and to transmit or receive the communication signal 320. For instance, if the UE 115-d determines that the duration of the inter-pulse interval 325 is long enough to include the retuning gap 330, the retuning gap 335, and the duration of the communication signal 320, the UE 115-d may determine that the inter-pulse interval 325 is sufficiently long (e.g., satisfies a threshold duration) and may transmit or receive the communication signal 320 (e.g., perform wireless communications) during the inter-pulse interval 325. Alternatively, if the UE 115-d determines that the duration of the inter-pulse interval 325 is not long enough to include the retuning gap 330, the retuning gap 335, and the duration of the communication signal 320, the UE 115-d may determine that the inter-pulse interval 325 is not sufficiently long (e.g., fails to satisfy a threshold) and may transmit or receive the communication signal 320 (e.g., perform wireless communications) outside of the inter-pulse interval 325.

In some examples, the configuration 310 may include an indication of a threshold or the UE 115-*d* may otherwise determine a threshold to use to determine whether the inter-pulse interval 325 has a sufficiently long duration to include the communication signal 320. For example, if the inter-pulse interval 325 has a duration equal to or less than 0.5 ms, the UE 115-*d* may determine that the inter-pulse interval 325 fails to satisfy the threshold and may perform wireless communications outside of the inter-pulse interval 325. For further example, if the inter-pulse interval 325 has a duration equal to or a greater than 10 ms, the UE 115-*d* may determine that the inter-pulse interval 325 satisfies the threshold and may perform wireless communications during the inter-pulse interval 325.

Additionally, or alternatively, the UE 115-*d* may determine a phase and amplitude continuity status of at least the sensing signal 315-*a* and the sensing signal 315-*b* based on the configuration 310. The phase and amplitude continuity status of at least the sensing signal 315-*a* and the sensing signal 315-*b* may be indicative of whether the sensing signal 315-*a* and the sensing signal 315-*b* have phase and amplitude continuity (e.g., the same phase and amplitude) or not. In some aspects, the phase and amplitude continuity status may indicate the phase and amplitude continuity status of two consecutive or adjacent sensing signals 315 (such as the sensing signal 315-*a* and the sensing signal 315-*b*) or may indicate the phase and amplitude continuity status of a set of adjacent or consecutive sensing signals 315 (e.g., a larger set of sensing signals including the sensing signal 315-*a* and the sensing signal 315-*b*). For example, the configuration 310 may indicate that a first set of sensing signals 315 do not have phase and amplitude continuity (e.g., that a first five sensing signals 315 do not have phase and amplitude continuity) and that a second set of sensing signals 315 (e.g., the remaining set of sensing signals 315 after the first five sensing signals 315) have phase and amplitude continuity.

In some examples, if the UE 115-*d* identifies a communication signal 320 to be transmitted or received between two adjacent sensing signals 315 (such as the sensing signal 315-*a* and the sensing signal 315-*b*), the UE 115-*d* may assume that the two adjacent sensing signals 315 do not have phase and amplitude continuity based on the configuration 310 or independently of the configuration 310. For instance, the configuration 310 may include an indication that the UE 115-*d* may determine that two adjacent sensing signals 315 do not have phase and amplitude continuity if a communication signal 320 is transmitted or received between the two adjacent sensing signals 315 or the UE 115-*d* may implicitly assume (e.g., without an indication in the configuration 310) that the two adjacent sensing signals 315 do not have phase and amplitude continuity if a communication signal 320 is transmitted or received between the two adjacent sensing signals 315. In some aspects, the UE 115-*d* may determine whether two adjacent sensing signals 315, such as the sensing signal 315-*a* and the sensing signal 315-*b*, that have a communication signal 320 transmitted or received between them have phase and amplitude continuity based on one or more parameters of the communication signal 320.

For example, the UE 115-*d* may condition the assumption that the sensing signal 315-*a* and the sensing signal 315-*b* do not have phase and amplitude continuity based on an identified transmission power of the communication signal 320, a bandwidth of the communication signal 320, a waveform of the communication signal 320, a time duration of the communication signal 320, a time difference between the communication signal 320 and the sensing signal 315-*b* (e.g., a remaining-time-to-next-pulse), or any combination thereof. For instance, if the communication signal 320 is transmitted using a transmission power below a threshold transmission power, has a bandwidth below a threshold bandwidth, uses a single carrier waveform (which may be transmitted close to the non-linear regime of the Vin to Vout curve), has a time duration below a threshold time duration, has a time difference between the communication signal 320 and the sensing signal 315-*b* greater than a threshold time difference, or any combination thereof, the UE 115-*d* may determine that the sensing signal 315-*a* and the sensing signal 315-*b* may maintain phase and amplitude continuity even in examples in which the communication signal 320 is transmitted or received between the sensing signal 315-*a* and the sensing signal 315-*b*.

In some examples, the phase and amplitude continuity status of at least the sensing signal 315-*a* and the sensing signal 315-*b* may be based on a capability of the UE 115-*d* to transmit adjacent or consecutive sensing signals 315 with phase and amplitude continuity. For example, the UE 115-*d* may report the capability of the UE 115-*d* to indicate whether the UE 115-*d* is able to guarantee phase and amplitude continuity for at least the sensing signal 315-*a* and the sensing signal 315-*b*. In some aspects, the capability of the UE 115-*d* for phase and amplitude continuity for at least the sensing signal 315-*a* and the sensing signal 315-*b* may be based on the inter-pulse interval 325 or whether the communication signal 320 is transmitted or received between the sensing signal 315-*a* and the sensing signal 315-*b*, or both. In examples in which the communication signal 320 is transmitted or received between the sensing signal 315-*a* and the sensing signal 315-*b*, the UE 115-*d* may additionally determine the capability of the UE 115-*d* based on an identified transmission power of the communication signal 320, a bandwidth of the communication signal 320, a waveform of the communication signal 320, a time duration of the communication signal 320, a time difference between the communication signal 320 and the sensing signal 315-*b* (e.g., a remaining-time-to-next-pulse), or any combination thereof.

Figure 4:
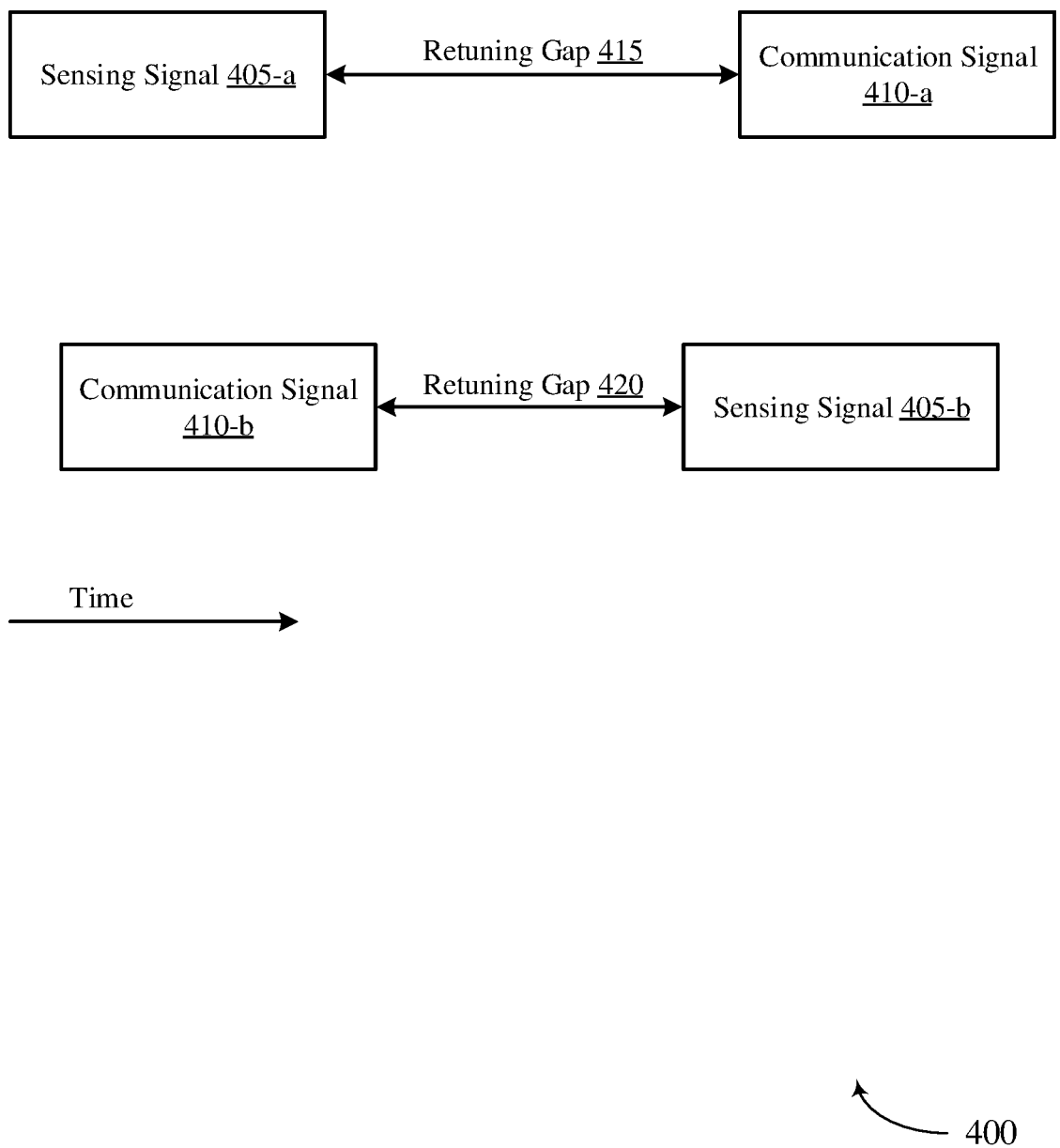
FIG. 4 illustrates examples of communication timelines that support configuring a retuning gap and amplitude and phase continuity for sensing and wireless communications in accordance with aspects of the present disclosure.

FIG. 4 illustrates examples of communication timelines 400 and 401 that support configuring a retuning gap and amplitude and phase continuity for sensing and wireless communications in accordance with aspects of the present disclosure. In some examples, the communication timelines 400 and 401 may be implemented to realize aspects of the wireless communications system 100, the wireless communications system 200, and the wireless communications system 300. The communication timelines 400 and 401 illustrate signaling between a base station 105 and a UE 115, which may be examples of corresponding devices described herein. In some examples, the base station 105 and the UE 115 may employ a TDM technique to multiplex sensing signals 405 and communication signals 410 within a shared radio frequency spectrum.

In some implementations, the UE 115 may determine a retuning gap 415 to use for retuning a radio frequency chain of the UE 115 when transitioning from transmitting or receiving a sensing signal 405-*a* to transmitting or receiving a communication signal 410-*a*, as shown in communication timeline 400, and a retuning gap 420 to use for retuning the radio frequency chain of the UE 115 when transitioning from transmitting or receiving a communication signal 410-*b* to transmitting or receiving a sensing signal 405-*b*, as shown in communication timeline 401. In some examples, the UE 115 may determine the retuning gap 415 and the retuning gap 420 based on a configuration received from the base station 105. In some other examples, the UE 115 may determine the retuning gap 415 and the retuning gap 420 based on a pre-configured rule at the UE 115 (e.g., a rule defined by a specification) or based on a capability of the UE 115.

In some aspects, the retuning gap 415 may have a longer time duration than the retuning gap 420 because of more difficulty or complexity associated with transitioning from communicating a first type of signal with a power amplifier operation point relatively near the non-linear regime of the Vin to Vout curve to communicating a second type of signal with a power amplifier operation point relatively far from the non-linear regime of the Vin to Vout curve than is associated with transitioning from communicating a first type of signal with a power amplifier operation point relatively far from the non-linear regime of the Vin to Vout curve to communicating a second type of signal with a power amplifier operation point relatively near the non-linear regime of the Vin to Vout curve. In some aspects, the retuning gap 415 may be equal to three milliseconds or three slots and the retuning gap 420 may be equal to zero milliseconds or zero slots.

Figure 5:
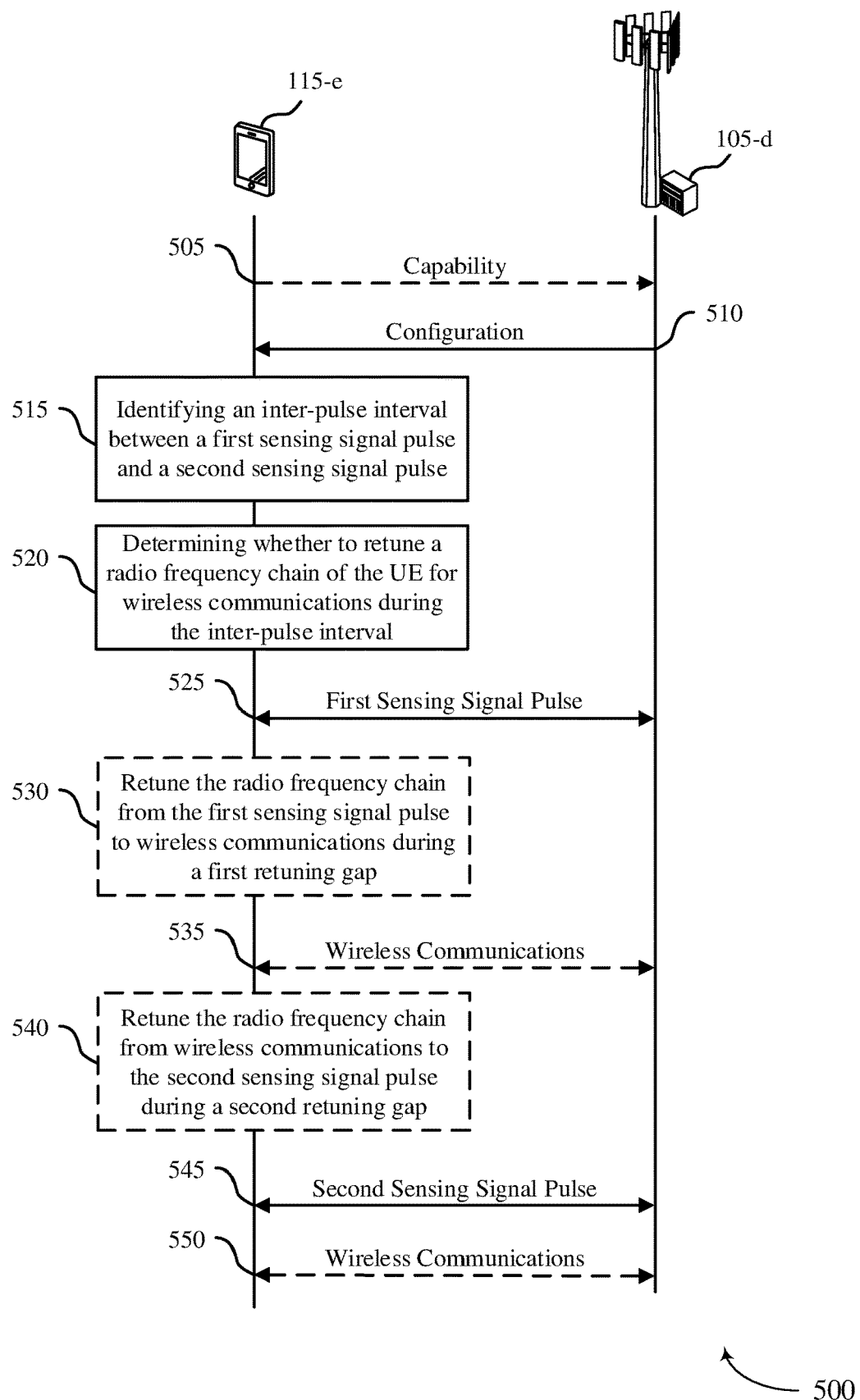
FIGS. 5 and 6 illustrate examples of process flows that support configuring a retuning gap and amplitude and phase continuity for sensing and wireless communications in accordance with aspects of the present disclosure.

FIG. 5 illustrates an example of a process flow 500 that supports configuring a retuning gap and amplitude and phase continuity for sensing and wireless communications in accordance with aspects of the present disclosure. In some examples, the process flow 500 may implement aspects of the wireless communications system 100, the wireless communications system 200, and the wireless communications system 300. The process flow 500 illustrates communications between a base station 105-d and a UE 115-e, which may be examples of corresponding devices described herein. In some implementations, the UE 115-e may determine whether there is sufficient time between two sensing signal pulses to transmit or receive wireless communications based on configured retuning gaps. Alternative examples of the following may be implemented, where some processes are performed in a different order than described or are not performed at all. In some implementations, processes may include additional features not mentioned below, or further processes may be added.

At 505, the UE 115-e may, in some implementations, transmit an indication of the capability of the UE 115-e to the base station 105-d. In some examples, the UE 115-e may determine a first retuning gap and a second retuning gap that the UE 115-e may use to retune a radio frequency chain of the UE 115-e based on the capability of the UE 115-e and may transmit the indication of the capability of the UE 115-e to the base station 105-d to enable the base station 105-d to configure the first retuning gap and the second retuning gap based on the capability of the UE 115-e.

At 510, the base station 105-d may transmit a configuration for TDM of sensing signals in a shared radio frequency spectrum band. As such, the base station 105-d and the UE 115-e may TDM sensing signals and wireless communications. In some examples, the configuration may include an indication of the first retuning gap and the second retuning gap. In some other examples, the base station 105-d may transmit the indication of the first retuning gap and the second retuning gap to the UE 115-e separate from the configuration transmitted at 510.

At 515, the UE 115-e may identify, from the configuration, an inter-pulse interval between a first sensing signal pulse (which may be equivalently referred to herein as a first sensing signal) and a second sensing signal pulse (which may be equivalently referred to herein as a second sensing signal). The inter-pulse interval may define the time duration between the end of the first sensing signal pulse and the beginning of the second sensing signal pulse. In some aspects, the inter-pulse interval may define a time duration between 525 and 545.

At 520, the UE 115-e may determine whether to retune a radio frequency chain of the UE 115-e for wireless communications during the inter-pulse interval based on the duration of the inter-pulse interval and the configuration. In some examples, the UE 115-e may determine whether to retune the radio frequency chain of the UE 115-e during the inter-pulse interval based on whether the duration of the inter-pulse interval satisfies a threshold time duration. For example, the UE 115-e may determine whether there is sufficient time between the first sensing signal pulse and the second sensing signal pulse to retune the radio frequency chain of the UE 115-e. In some aspects, the threshold may be indicated by the configuration, may be indicated by the base station 105-d via other signaling, or may be pre-configured at the UE 115-e.

At 525, the UE 115-e may transmit or receive the first sensing signal pulse. The base station 105-d may likewise receive or transmit the first sensing signal pulse.

At 530, the UE 115-e may, in some implementations, retune the radio frequency chain of the UE 115-e from the first sensing signal pulse to wireless communications during the first retuning gap. In some examples, the UE 115-e may determine to retune the radio frequency chain of the UE 115-e from the first sensing signal pulse to wireless communications based on determining that the inter-pulse interval is sufficiently long to include wireless communications (e.g., sufficiently long to retune the radio frequency chain to from the first sensing signal pulse to wireless communications and to retune the radio frequency chain from wireless communications to the second sensing signal pulse). The first retuning gap may span a number of milliseconds or slots, such as three milliseconds or three slots.

At 535, the UE 115-e may, in some implementations, perform (e.g., transmit or receive) wireless communications during the inter-pulse interval based on determining that the inter-pulse interval is sufficiently long to include wireless communications. For example, the UE 115-e may determine to perform wireless communications during the inter-pulse interval based on determining that the duration of the inter-pulse interval satisfies the threshold.

At 540, the UE 115-e may, in some implementations, retune the radio frequency chain of the UE 115-e from wireless communications to the second sensing signal pulse during a second retuning gap. The UE 115-a may retune the radio frequency chain of the UE 115-e in examples in which the UE 115-e performs wireless communications at 535 during the inter-pulse interval. The second retuning gap may span a number of milliseconds or slots and may be shorter in time than the first retuning gap. For example, the second retuning gap may be zero milliseconds or zero slots.

At 545, the UE 115-e may transmit or receive the second sensing signal pulse. The base station 105-d may likewise receive or transmit the second sensing signal pulse.

At 550, the UE 115-e may, in some implementations, perform wireless communications outside of the inter-pulse interval based on determining that the inter-pulse interval is not sufficiently long to include the first retuning gap, the second retuning gap, and wireless communications. For example, the UE 115-e may determine to perform wireless communications outside of the inter-pulse interval based on determining that the duration of the inter-pulse interval fails to satisfy the threshold. In examples in which the UE 115-e performs wireless communications outside of the inter-pulse interval, the UE 115-e may refrain from retuning the radio frequency chain of the UE 115-e during the inter-pulse interval and, as such, may refrain from performing the processes illustrated at 530 through 540.

Figure 6:
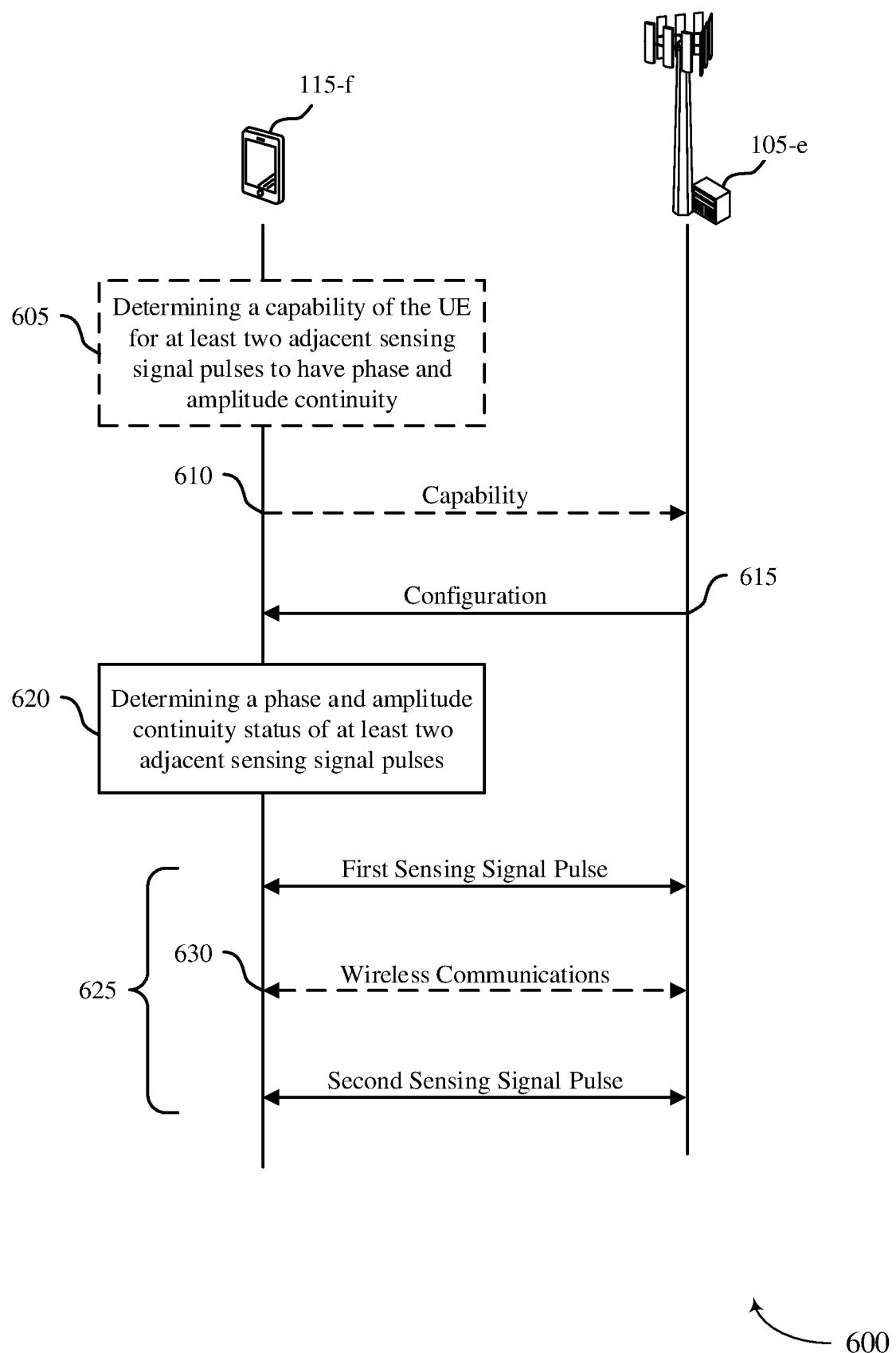

FIG. 6 illustrates an example of a process flow 600 that supports configuring a retuning gap and amplitude and phase continuity for sensing and wireless communications in accordance with aspects of the present disclosure. In some examples, the process flow 600 may implement aspects of the wireless communications system 100, the wireless communications system 200, and the wireless communications system 300. The process flow 600 illustrates communications between a base station 105-e and a UE 115-f, which may be examples of corresponding devices described herein. In some implementations, the UE 115-f may determine a phase and amplitude continuity status for multiple adjacent (e.g., consecutive) sensing signal pulses based on a configuration from the base station 105-e or a capability of the UE 115-f, or both. Alternative examples of the following may be implemented, where some processes are performed in a different order than described or are not performed at all. In some implementations, processes may include additional features not mentioned below, or further processes may be added.

At 605, the UE 115-f may, in some implementations, determine a capability of the UE 115-f for at least two adjacent sensing signal pulses to have phase and amplitude continuity. In some examples, the capability of the UE 115-f to have phase and amplitude continuity across the at least two adjacent sensing signal pulses may be based on an inter-pulse interval between the at least two adjacent sensing signal pulses and a presence of wireless communications between the at least two adjacent sensing signal pulses. For example, the presence of wireless communications between the at least two sensing signal pulses may likely cause phase and amplitude discontinuity between the at least two adjacent sensing signal pulses in examples in which the inter-pulse interval is less than a threshold time duration, the transmit power of the wireless communications is greater than a threshold transmit power, the bandwidth of the wireless communications is greater than a threshold bandwidth, the duration of the wireless communications is greater than a threshold time duration, the time difference between the wireless communications and the next sensing signal pulse is less than a threshold time duration, or any combination thereof. Additionally or alternatively, some waveform types may influence the capability of the UE 115-f to have phase and amplitude continuity across the at least two adjacent sensing signal pulses.

At 610, the UE 115-f may, in some implementations, transmit an indication of the capability of the UE 115-f to the base station 105-e. In some examples, the base station 105-e may use the capability of the UE 115-f for having phase and amplitude continuity between the at least two adjacent sensing signal pulses to configure a phase and amplitude continuity status of the at least two adjacent sensing signal pulses.

At 615, the base station 105-e may transmit a configuration for TDM of sensing signals in a shared radio frequency spectrum band. As such, the base station 105-e and the UE 115-f may TDM sensing signals and wireless communications. In some examples, the configuration may include an indication of the phase and amplitude continuity status of the at least two adjacent sensing signal pulses.

At 620, the UE 115-f may determine, based on the configuration, the phase and amplitude continuity status of the at least two adjacent sensing signal pulses. The phase and amplitude continuity status may be indicative of the phase and amplitude continuity of at least the two adjacent sensing signal pulses, which may be equivalently referred to as whether the at least two adjacent sensing signal pulses have the same phases and the same amplitudes. In some examples, the UE 115-f may additionally determine the phase and amplitude continuity status of the at least two adjacent sensing signal pulses based on performing wireless communications between the at least two adjacent sensing signal pulses and based on one or more parameters of the wireless communications. The dependency of the phase and amplitude continuity status of the at least two adjacent sensing signal pulses on the presence of wireless communications between the at least two adjacent sensing signal pulses may be included in the configuration or may be pre-configured at the UE 115-f. In some examples, the UE 115-f may determine, based on the configuration, the phase and amplitude continuity status of a set of adjacent sensing signal pulses including the at least two adjacent sensing signal pulses.

During 625, the UE 115-f and the base station 105-e may participate in sensing operations that include the at least two adjacent sensing signal pulses based on the phase and amplitude continuity status and the configuration. For example, the UE 115-f may transmit or receive a first sensing signal pulse and a second sensing signal pulse, which may be examples of two adjacent sensing signal pulses.

At 630, which may be during 625, the UE 115-f may, in some implementations, perform wireless communications between the at least two adjacent sensing signal pulses (e.g., between the first sensing signal pulse and the second sensing signal pulse). In such examples, the UE 115-f and the base station 105-e may determine whether the at least two adjacent sensing signal pulses have phase and amplitude continuity based on one or more parameters of the wireless communications. For example, the UE 115-f and the base station 105-f may determine the phase and amplitude continuity status of the at least two adjacent sensing signal pulses based on a transmit power of the wireless communications, a bandwidth of the wireless communications, a waveform of the wireless communications, a duration of the wireless communications, a time difference between wireless communications and a next sensing signal pulse, or any combination thereof.

Figure 7:
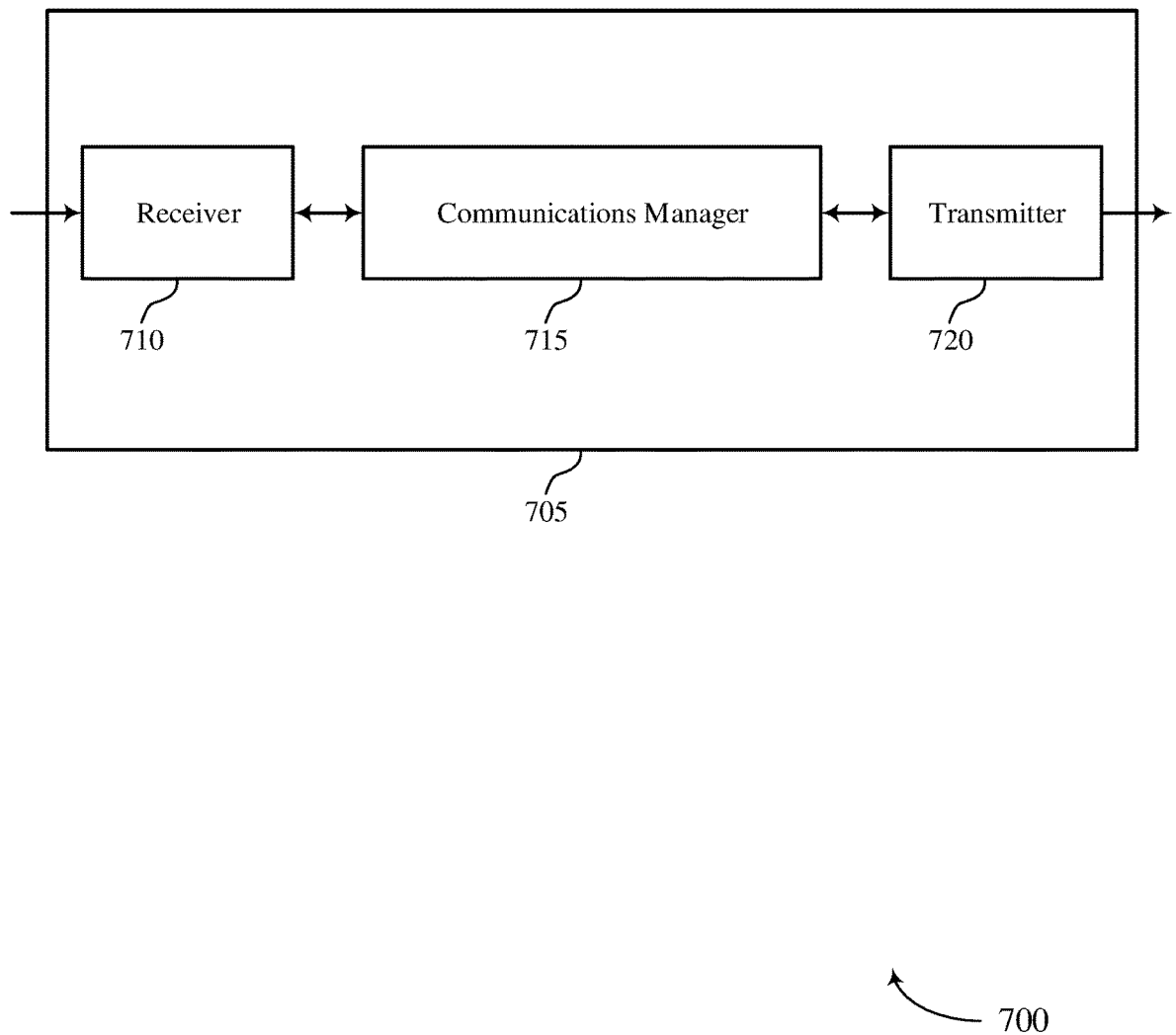
FIGS. 7 and 8 show block diagrams of devices that support configuring a retuning gap and amplitude and phase continuity for sensing and wireless communications in accordance with aspects of the present disclosure.

FIG. 7 shows a block diagram 700 of a device 705 that supports configuring a retuning gap and amplitude and phase continuity for sensing and wireless communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to configuring a retuning gap and amplitude and phase continuity for sensing and wireless communications, etc.). Information may be passed on to other components of the device 705. The receiver 710 may be an example of aspects of the transceiver 1020 described with reference to FIG. 10. The receiver 710 may utilize a single antenna or a set of antennas.

In some implementations, the communications manager 715 may receive a configuration for TDM of sensing signals in a shared radio frequency spectrum band, identify, from the configuration, an inter-pulse interval between a first sensing signal pulse and a second sensing signal pulse, determine whether to retune a radio frequency chain of the UE for wireless communications during the inter-pulse interval based on a duration of the inter-pulse interval and the configuration, and perform wireless communications either during the inter-pulse interval or outside of the inter-pulse interval based on the determination.

In some other implementations, the communications manager 715 may receive a configuration for TDM of sensing signals in a shared radio frequency spectrum band, determine, based on the configuration, a phase and amplitude continuity status of at least two adjacent sensing signal pulses, where the phase and amplitude continuity status is indicative of a phase and amplitude continuity of the at least two adjacent sensing signal pulses, and participate in sensing operations that include the at least two adjacent sensing signal pulses based on the phase and amplitude continuity status and the configuration.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communications manager 715 may be an example of aspects of the communications manager 1010 described herein.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and the transmitter 720 may be implemented as analog components (e.g., amplifiers, filters, antennas) coupled with the mobile device modem to enable wireless transmission and reception over one or more bands.

The communications manager 715 as described herein may be implemented to realize one or more potential advantages. In some implementations of the present disclosure, the communications manager 715 may receive a configuration for retuning gaps that the communications manager 715 may use to retune a radio frequency chain of the device 705 based on the type of signaling the communications manager 715 is transitioning between. For example, the communications manager 715 may use a longer retuning gap when transitioning from a sensing signal to a communication signal and a shorter retuning gap when transitioning from a communication signal to a sensing signal based on the relative complexities associated with retuning the radio frequency chain of the device 705 between such signaling. As such, the communications manager 715, or one or more processing units of or in communication with the communications manager 715, may more optimally process or allocate processing tasks based on using retuning gaps that are based on the complexity of the transition. Based on more optimally processing or allocating processing tasks, the communications manager 715, or one or more processing units of or in communication with the communications manager 715, may power off more frequency or spend longer durations in a sleep mode, or both. Accordingly, the device 705 may experience increased power savings and improved battery life.

Further, the communications manager 715 may experience an increase in the likelihood for accurate transmission or reception of sensing signal pulses based on receiving a configuration of a phase and amplitude continuity status of at least two adjacent sensing signal pulses, which may enable the communications manager 715 to make more optimal decisions based on more accurate information relating to the presence or location of one or more objects near the device 705. For instance, such communication of a phase and amplitude continuity status between the communications manager 715 and a base station may enable the communications manager 715, in examples in which the device 705 is a vehicle or another device capable of moving, such as a drone, to make more optimal driving assistance decisions, which may improve driving performance and safety.

Figure 8:
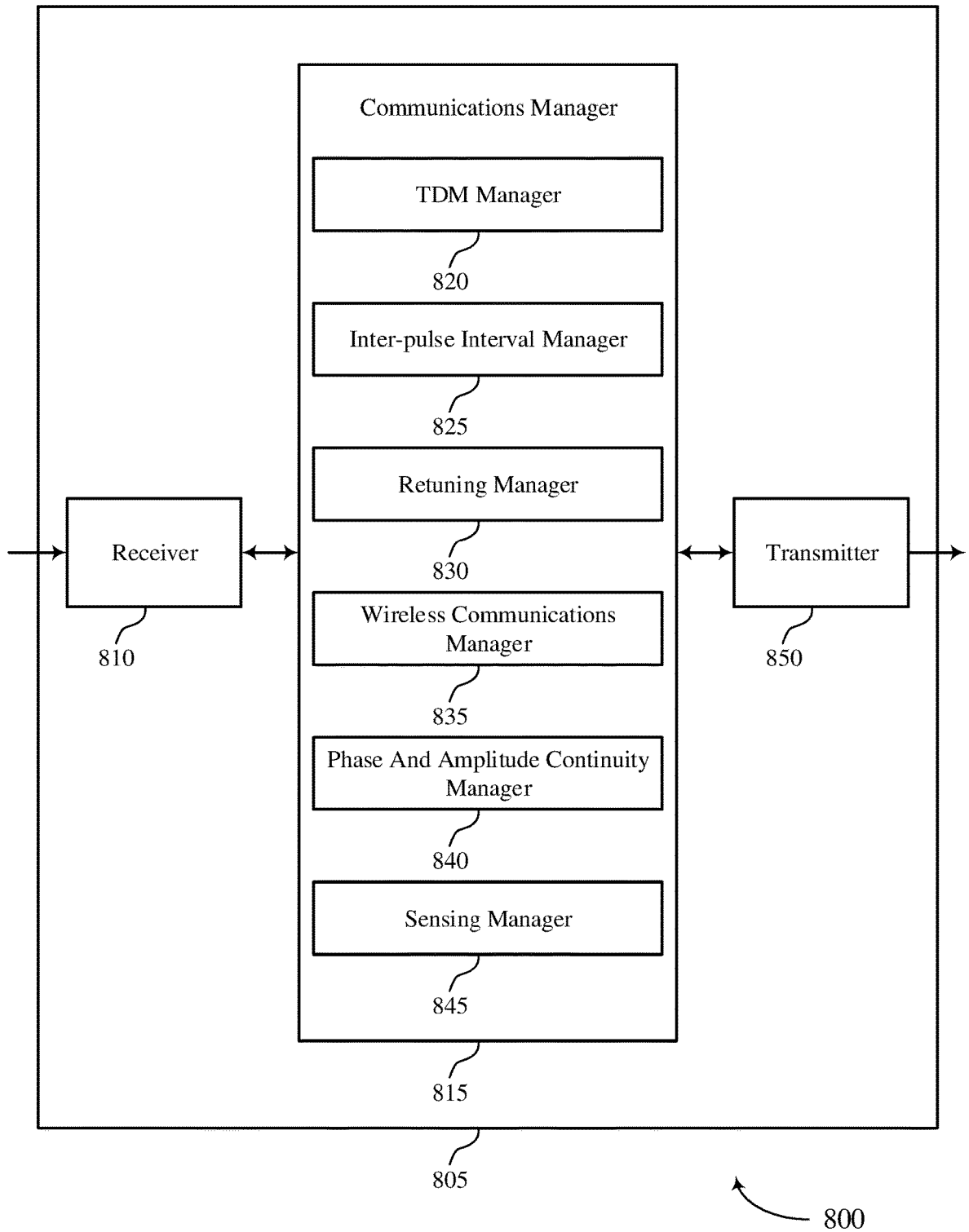

FIG. 8 shows a block diagram 800 of a device 805 that supports configuring a retuning gap and amplitude and phase continuity for sensing and wireless communications in accordance with aspects of the present disclosure. The device 805 may be an example of aspects of a device 705, or a UE 115 as described herein. The device 805 may include a receiver 810, a communications manager 815, and a transmitter 850. The device 805 may also include a processor. Each of these components may be in communication with one another (e.g., via one or more buses).

The receiver 810 may receive information such as packets, user data, or control information associated with various information channels (e.g., control channels, data channels, and information related to configuring a retuning gap and amplitude and phase continuity for sensing and wireless communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a TDM manager 820, an inter-pulse interval manager 825, a retuning manager 830, a wireless communications manager 835, a phase and amplitude continuity manager 840, and a sensing manager 845. The communications manager 815 may be an example of aspects of the communications manager 1010 described herein.

In some implementations, the device 805 may determine whether an inter-pulse interval between a first sensing signal pulse and a second sensing signal pulse is long enough to support retuning of a radio frequency chain of the device 805 for wireless communications during the inter-pulse interval. In such implementations, the TDM manager 820 may receive a configuration for TDM of sensing signals in a shared radio frequency spectrum band and the inter-pulse interval manager 825 may identify, from the configuration, an inter-pulse interval between a first sensing signal pulse and a second sensing signal pulse. The retuning manager 830 may determine whether to retune a radio frequency chain of the UE for wireless communications during the inter-pulse interval based on a duration of the inter-pulse interval and the configuration and the wireless communications manager 835 may perform wireless communications either during the inter-pulse interval or outside of the inter-pulse interval based on the determination.

In some other implementations, the device 805 may determine whether multiple adjacent or consecutive sensing signal pulses have phase and amplitude continuity and may participate in a sensing procedure including the multiple adjacent or consecutive sensing signal pulses accordingly. In such implementations, the TDM manager 820 may receive a configuration for TDM of sensing signals in a shared radio frequency spectrum band and the phase and amplitude continuity manager 840 may determine, based on the configuration, a phase and amplitude continuity status of at least two adjacent sensing signal pulses, where the phase and amplitude continuity status is indicative of a phase and amplitude continuity of the at least two adjacent sensing signal pulses. The sensing manager 845 may participate in sensing operations that include the at least two adjacent sensing signal pulses based on the phase and amplitude continuity status and the configuration.

The transmitter 850 may transmit signals generated by other components of the device 805. In some examples, the transmitter 850 may be collocated with a receiver 810 in a transceiver module. For example, the transmitter 850 may be an example of aspects of the transceiver 1020 described with reference to FIG. 10. The transmitter 850 may utilize a single antenna or a set of antennas.

Figure 9:
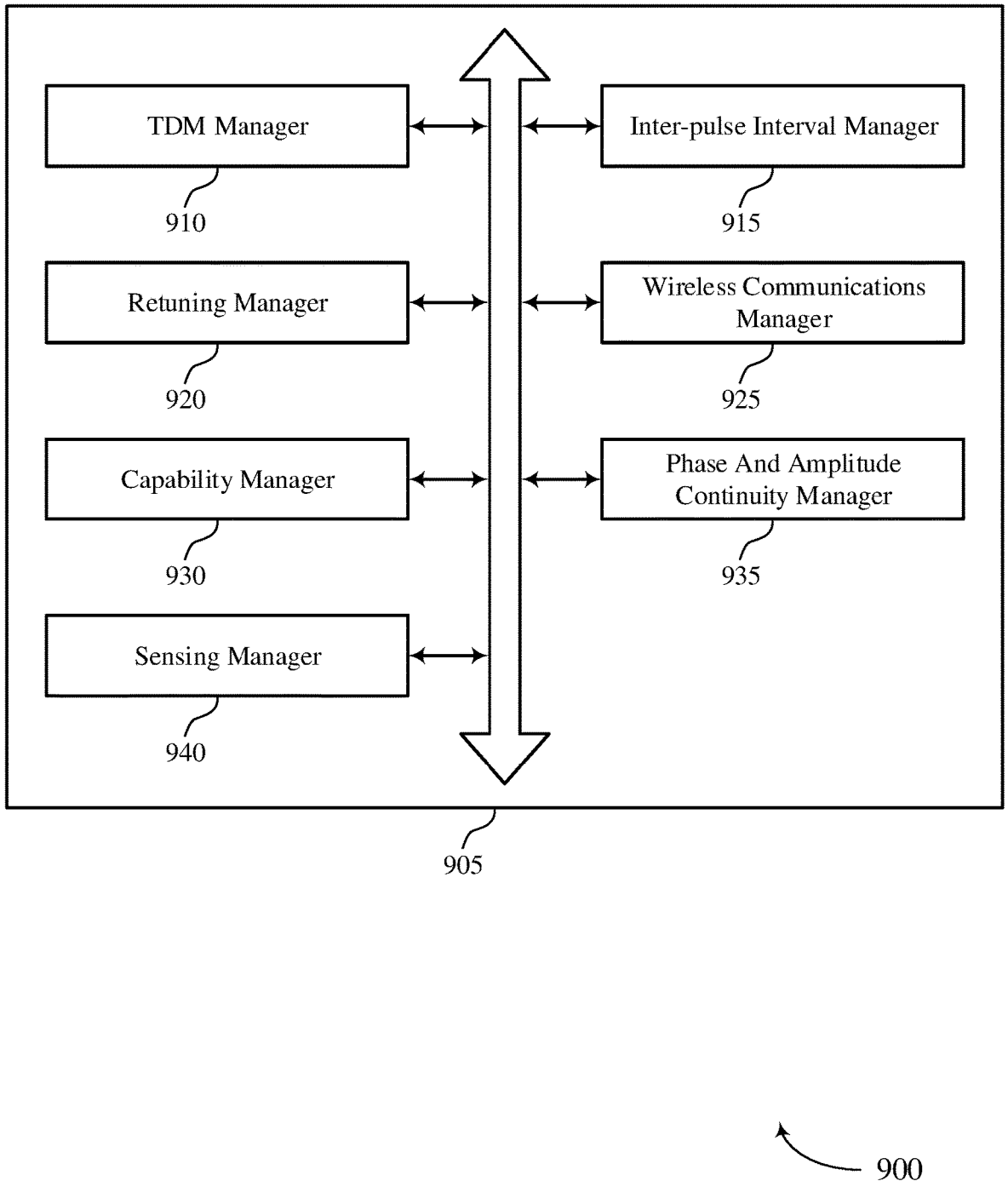
FIG. 9 shows a block diagram of a communications manager that supports configuring a retuning gap and amplitude and phase continuity for sensing and wireless communications in accordance with aspects of the present disclosure.

FIG. 9 shows a block diagram 900 of a communications manager 905 that supports configuring a retuning gap and amplitude and phase continuity for sensing and wireless communications in accordance with aspects of the present disclosure. The communications manager 905 may be an example of aspects of a communications manager 715, a communications manager 815, or a communications manager 1010 described herein. The communications manager 905 may include a TDM manager 910, an inter-pulse interval manager 915, a retuning manager 920, a wireless communications manager 925, a capability manager 930, a phase and amplitude continuity manager 935, and a sensing manager 940. Each of these modules may communicate, directly or indirectly, with one another (e.g., via one or more buses).

In some implementations, the communications manager 905 may determine whether an inter-pulse interval between a first sensing signal pulse and a second sensing signal pulse is long enough to support retuning of a radio frequency chain of the communications manager 905 for wireless communications during the inter-pulse interval.

The TDM manager 910 may receive a configuration for TDM of sensing signals in a shared radio frequency spectrum band.

The inter-pulse interval manager 915 may identify, from the configuration, an inter-pulse interval between a first sensing signal pulse and a second sensing signal pulse. In some examples, the inter-pulse interval manager 915 may determine that the duration of the inter-pulse interval satisfies a threshold, where performing wireless communications during the inter-pulse interval is based on the duration of the inter-pulse interval satisfying the threshold. In some examples, the inter-pulse interval manager 915 may determine that the duration of the inter-pulse interval fails to satisfy a threshold, where performing wireless communications outside of the inter-pulse interval is based on the duration of the inter-pulse interval failing to satisfy the threshold.

The retuning manager 920 may determine whether to retune a radio frequency chain of the UE for wireless communications during the inter-pulse interval based on a duration of the inter-pulse interval and the configuration. In some examples, the retuning manager 920 may retune the radio frequency chain from the first sensing signal pulse to wireless communications during a first retuning gap. In some examples, the retuning manager 920 may retune the radio frequency chain from wireless communications to the second sensing signal pulse during a second retuning gap.

In some examples, the retuning manager 920 may receive, from a base station, an indication of the first retuning gap and the second retuning gap. In some examples, the retuning manager 920 may determine the first retuning gap and the second retuning gap based on a pre-configured rule of the UE. In some examples, the retuning manager 920 may determine the first retuning gap and the second retuning gap based on a capability of the UE. In some examples, the capability manager 930 may transmit, to a base station, the capability of the UE.

In some cases, the first retuning gap is longer than the second retuning gap. In some cases, the first retuning gap is three milliseconds or three slots. In some cases, the second retuning gap is zero milliseconds or zero slots.

The wireless communications manager 925 may perform wireless communications either during the inter-pulse interval or outside of the inter-pulse interval based on the determination.

In some other implementations, the communications manager 905 may determine whether multiple adjacent or consecutive sensing signal pulses have phase and amplitude continuity and may participate in a sensing procedure including the multiple adjacent or consecutive sensing signal pulses accordingly.

In some examples, the TDM manager 910 may receive a configuration for TDM of sensing signals in a shared radio frequency spectrum band.

The phase and amplitude continuity manager 935 may determine, based on the configuration, a phase and amplitude continuity status of at least two adjacent sensing signal pulses, where the phase and amplitude continuity status is indicative of a phase and amplitude continuity of the at least two adjacent sensing signal pulses. In some examples, the phase and amplitude continuity manager 935 may determine, based on the configuration, the phase and amplitude continuity status of a set of adjacent sensing signal pulses, where the set of adjacent sensing signal pulses includes the at least two adjacent sensing signal pulses.

In some examples, the wireless communications manager 925 may perform wireless communications between the at least two adjacent sensing signal pulses. In some examples, the phase and amplitude continuity manager 935 may determine the phase and amplitude continuity status of the at least two adjacent sensing signal pulses based on performing wireless communications between the at least two adjacent sensing signal pulses and one or more parameters of wireless communications. In some cases, the one or more parameters of wireless communications include one or more of a transmit power of wireless communications, a bandwidth of wireless communications, a waveform of wireless communications, a duration of wireless communications, and a time difference between wireless communications and a next sensing signal pulse.

The sensing manager 940 may participate in sensing operations that include the at least two adjacent sensing signal pulses based on the phase and amplitude continuity status and the configuration.

In some examples, the capability manager 930 may determine a capability of the UE for the at least two adjacent sensing signal pulses to have phase and amplitude continuity, where the phase and amplitude continuity status of the at least two adjacent sensing signal pulses is based on the capability of the UE. In some examples, the capability manager 930 may transmit, to a base station, the capability of the UE. In some cases, the capability of the UE for the at least two adjacent sensing signal pulses to have phase and amplitude continuity is based on one or both of an inter-pulse interval between the at least two adjacent sensing signal pulses and a presence of wireless communications between the at least two adjacent sensing signal pulses.

Figure 10:
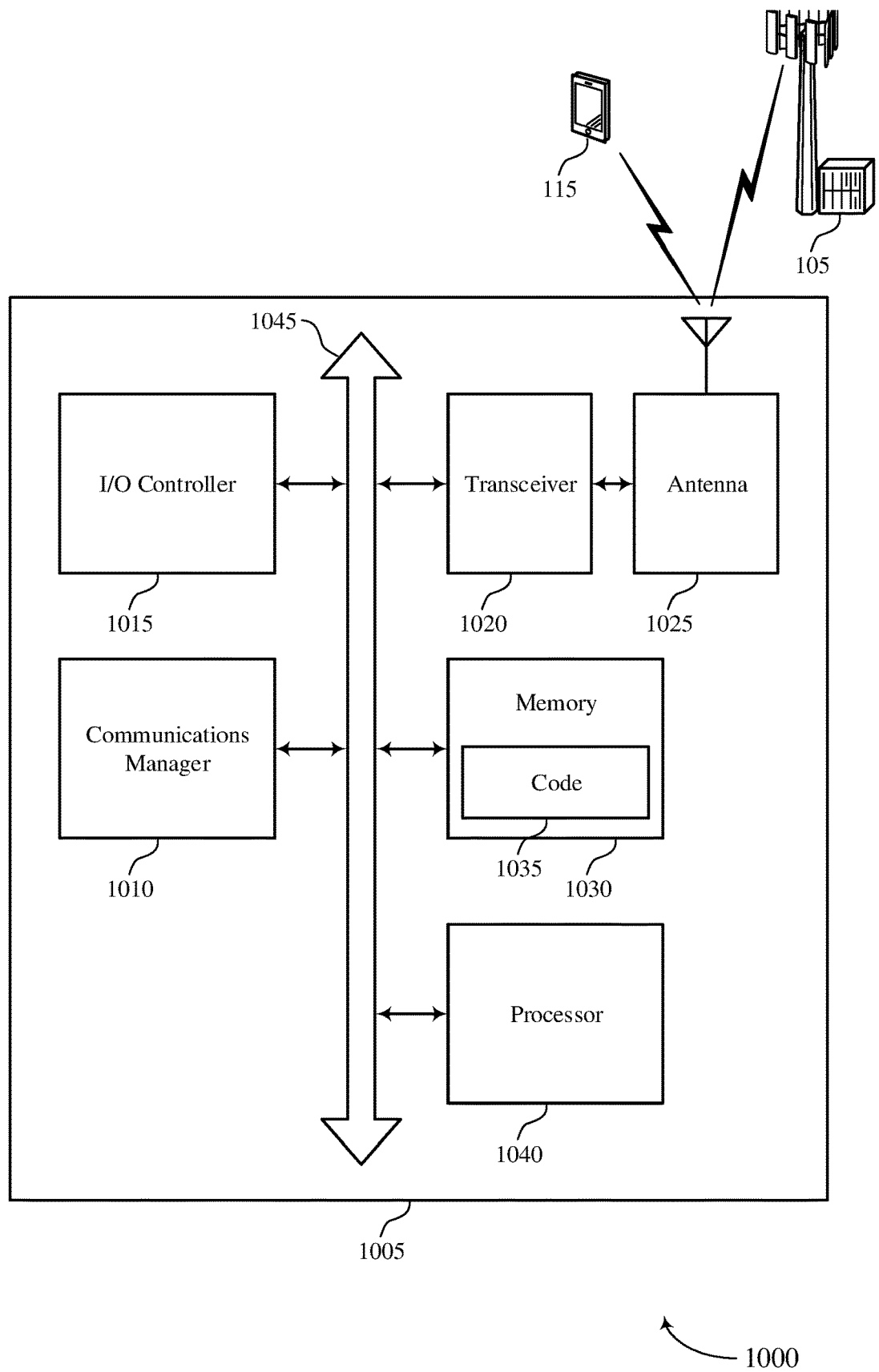
FIG. 10 shows a diagram of a system including a device that supports configuring a retuning gap and amplitude and phase continuity for sensing and wireless communications in accordance with aspects of the present disclosure.

FIG. 10 shows a diagram of a system 1000 including a device 1005 that supports configuring a retuning gap and amplitude and phase continuity for sensing and wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

In some implementations, the communications manager 1010 may receive a configuration for TDM of sensing signals in a shared radio frequency spectrum band, identify, from the configuration, an inter-pulse interval between a first sensing signal pulse and a second sensing signal pulse, determine whether to retune a radio frequency chain of the UE for wireless communications during the inter-pulse interval based on a duration of the inter-pulse interval and the configuration, and perform wireless communications either during the inter-pulse interval or outside of the inter-pulse interval based on the determination.

In some other implementations, the communications manager 1010 may receive a configuration for TDM of sensing signals in a shared radio frequency spectrum band, determine, based on the configuration, a phase and amplitude continuity status of at least two adjacent sensing signal pulses, where the phase and amplitude continuity status is indicative of a phase and amplitude continuity of the at least two adjacent sensing signal pulses, and participate in sensing operations that include the at least two adjacent sensing signal pulses based on the phase and amplitude continuity status and the configuration.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting configuring a retuning gap and amplitude and phase continuity for sensing and wireless communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
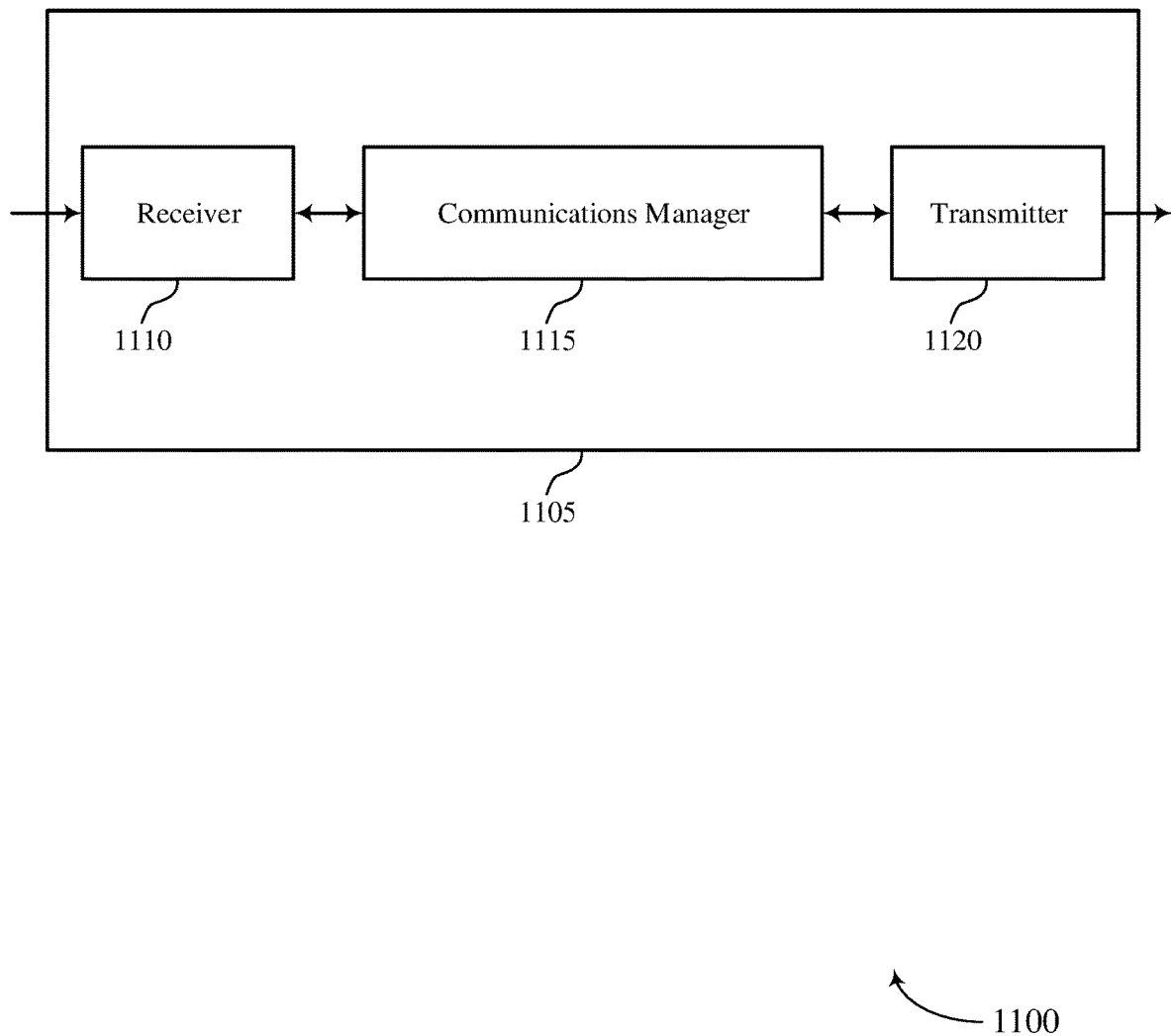
FIGS. 11 and 12 show block diagrams of devices that support configuring a retuning gap and amplitude and phase continuity for sensing and wireless communications in accordance with aspects of the present disclosure.

FIG. 11 shows a block diagram 1100 of a device 1105 that supports configuring a retuning gap and amplitude and phase continuity for sensing and wireless communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to configuring a retuning gap and amplitude and phase continuity for sensing and wireless communications, etc.). Information may be passed on to other components of the device 1105. The receiver 1110 may be an example of aspects of the transceiver 1420 described with reference to FIG. 14. The receiver 1110 may utilize a single antenna or a set of antennas.

In some implementations, the communications manager 1115 may identify an inter-pulse interval between a first sensing signal pulse and a second sensing signal pulse, transmit, to a UE, a configuration for TDM of sensing signals with wireless communications with the UE within a shared spectrum, the configuration including the inter-pulse interval between the first sensing signal pulse and the second sensing signal pulse, and perform wireless communications with the UE either during the inter-pulse interval or outside of the inter-pulse interval based on a duration of the inter-pulse interval.

In some other implementations, the communications manager 1115 may determine a phase and amplitude continuity status of at least two adjacent sensing signal pulses, where the phase and amplitude continuity status is indicative of the at least two adjacent sensing signal pulses either having phase and amplitude continuity or not having phase and amplitude continuity, transmit, to a UE, a configuration for TDM of sensing signals with wireless communications with the UE within a shared spectrum, the configuration including the phase and amplitude continuity status of the at least two adjacent sensing signal pulses, and participate in sensing operations that include the at least two adjacent sensing signal pulses based on the phase and amplitude continuity status. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

The communications manager 1115 as described herein may be implemented to realize one or more potential advantages. In some implementations, the communications manager 1115 may configure retuning gaps during which a UE may retune a radio frequency chain of the UE based on the type of signaling the UE is transitioning between. For example, the communications manager 1115 may configure a longer retuning gap when the UE is transitioning from a sensing signal to a communication signal and a shorter retuning gap when the UE is transitioning from a communication signal to a sensing signal based on the relative complexities associated with retuning the radio frequency chain of the UE between such signaling. As such, the communications manager 1115 may increase the likelihood for successful wireless communications between the device 1105 and the UE as well as the performance of sensing operations, such as multi-node cooperative passive sensing operations, between the device 1105 and the UE.

Based on increasing the likelihood for successful communications between the device 1105 and the UE, the communications manager 1115 may transmit less control signaling to the UE, which may reduce signaling overhead and increase spectral efficiency. Further, based on reducing signaling overhead, the communications manager 1115 may either power off one or more components associated with processing and transmitting downlink signaling or re-task such components with other downlink signaling, which may improve the power efficiency of the device 1105 or increase the achievable throughput of the system.

Figure 12:
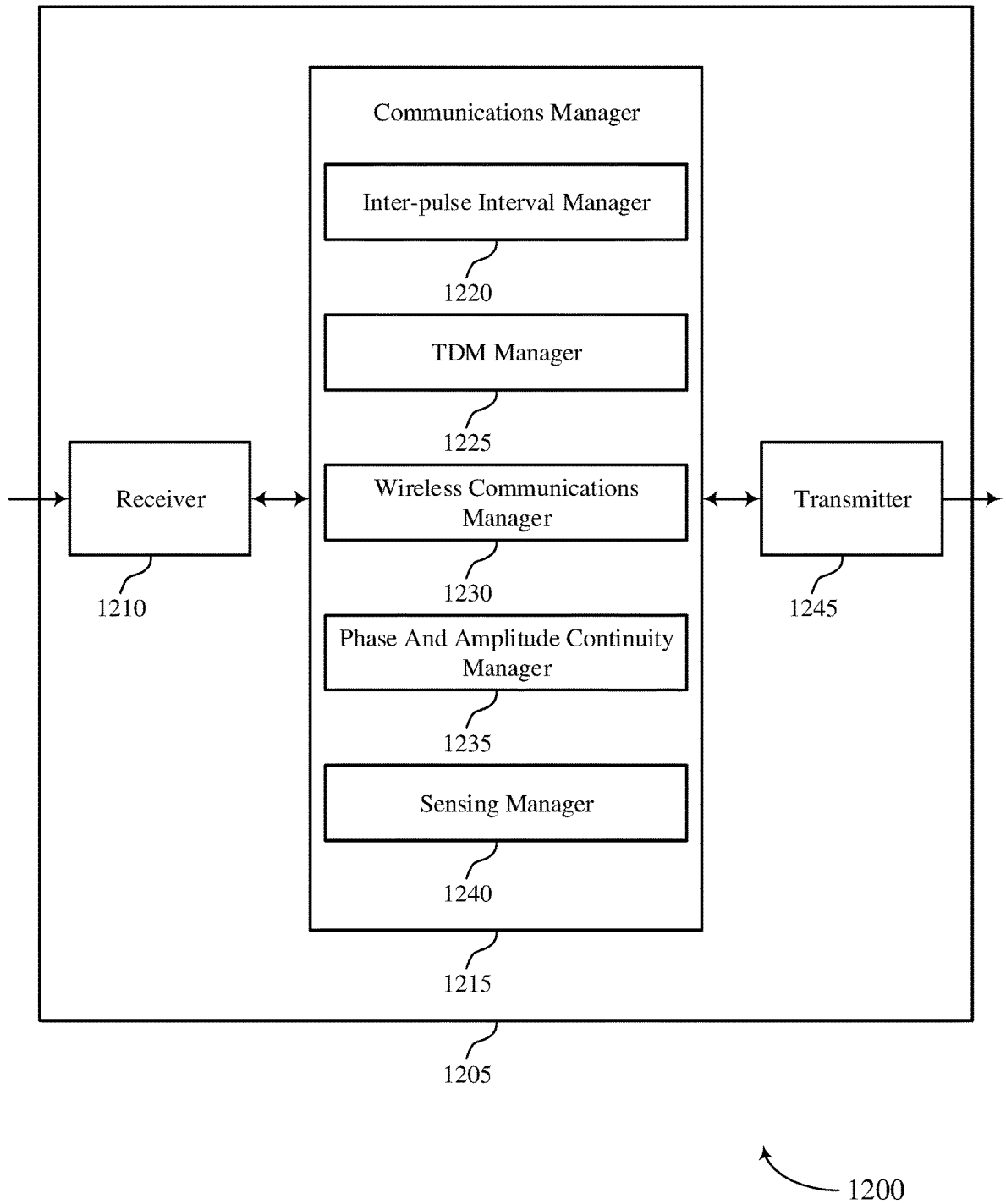

FIG. 12 shows a block diagram 1200 of a device 1205 that supports configuring a retuning gap and amplitude and phase continuity for sensing and wireless communications in accordance with aspects of the present disclosure. The device 1205 may be an example of aspects of a device 1105, or a base station 105 as described herein. The device 1205 may include a receiver 1210, a communications manager 1215, and a transmitter 1245. The device 1205 may also include a processor. Each of these components may be in communication with one another (e.g., via one or more buses).

The receiver 1210 may receive information such as packets, user data, or control information associated with various information channels (e.g., control channels, data channels, and information related to configuring a retuning gap and amplitude and phase continuity for sensing and wireless communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an inter-pulse interval manager 1220, a TDM manager 1225, a wireless communications manager 1230, a phase and amplitude continuity manager 1235, and a sensing manager 1240. The communications manager 1215 may be an example of aspects of the communications manager 1410 described herein.

In some implementations, the device 1205 may determine whether an inter-pulse interval between a first sensing signal pulse and a second sensing signal pulse is long enough to support retuning of a radio frequency chain of a UE for wireless communications during the inter-pulse interval. In such implementations, the inter-pulse interval manager 1220 may identify an inter-pulse interval between a first sensing signal pulse and a second sensing signal pulse and the TDM manager 1225 may transmit, to a UE, a configuration for TDM of sensing signals with wireless communications with the UE within a shared spectrum, the configuration including the inter-pulse interval between the first sensing signal pulse and the second sensing signal pulse. The wireless communications manager 1230 may perform wireless communications with the UE either during the inter-pulse interval or outside of the inter-pulse interval based on a duration of the inter-pulse interval.

In some other implementations, the device 1205 may determine whether multiple adjacent or consecutive sensing signal pulses have phase and amplitude continuity and may participate in a sensing procedure including the multiple adjacent or consecutive sensing signal pulses accordingly. In such implementations, the phase and amplitude continuity manager 1235 may determine a phase and amplitude continuity status of at least two adjacent sensing signal pulses, where the phase and amplitude continuity status is indicative of the at least two adjacent sensing signal pulses either having phase and amplitude continuity or not having phase and amplitude continuity, and the TDM manager 1225 may transmit, to a UE, a configuration for TDM of sensing signals with wireless communications with the UE within a shared spectrum, the configuration including the phase and amplitude continuity status of the at least two adjacent sensing signal pulses. The sensing manager 1240 may participate in sensing operations that include the at least two adjacent sensing signal pulses based on the phase and amplitude continuity status.

The transmitter 1245 may transmit signals generated by other components of the device 1205. In some examples, the transmitter 1245 may be collocated with a receiver 1210 in a transceiver module. For example, the transmitter 1245 may be an example of aspects of the transceiver 1420 described with reference to FIG. 14. The transmitter 1245 may utilize a single antenna or a set of antennas.

Figure 13:
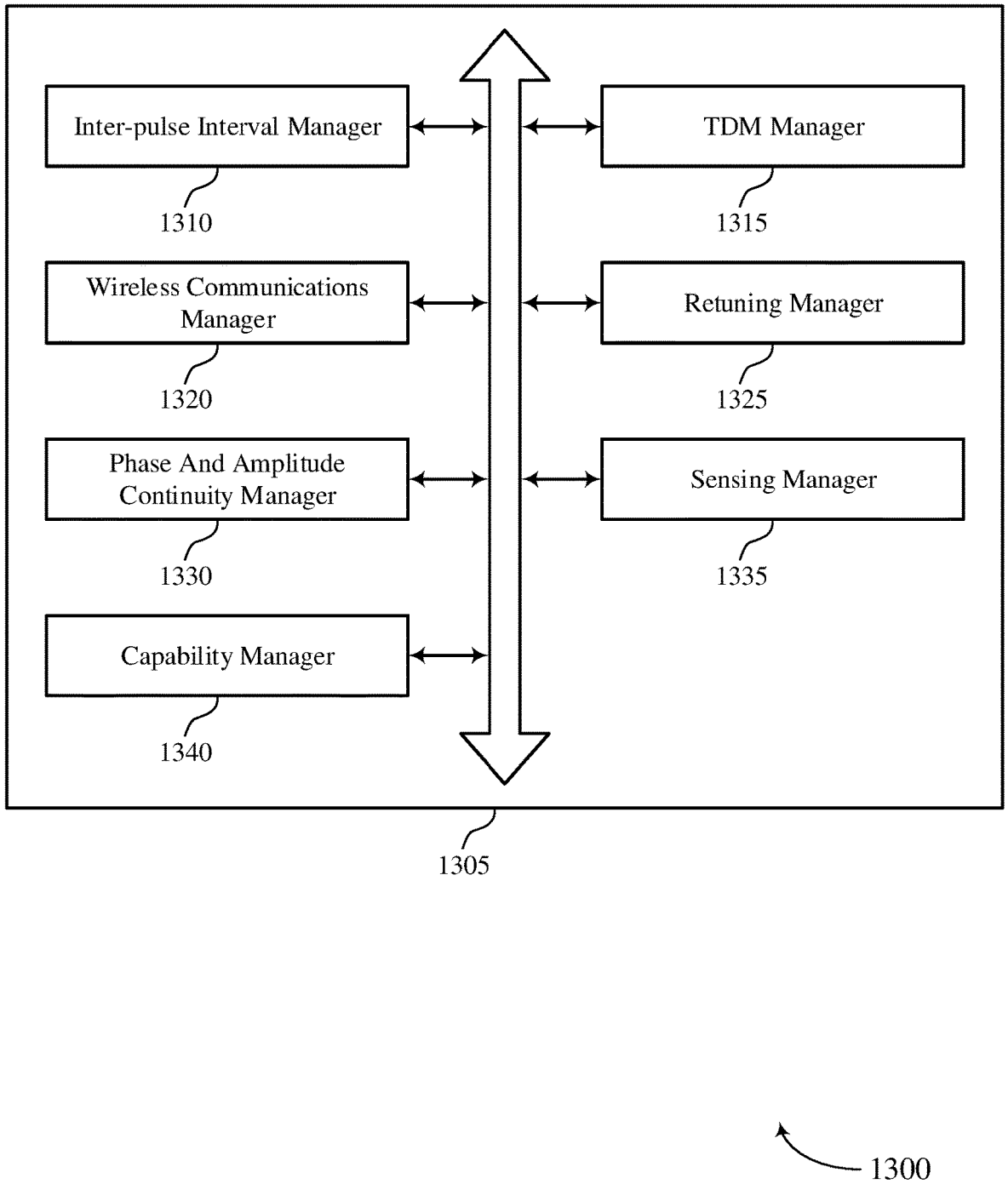
FIG. 13 shows a block diagram of a communications manager that supports configuring a retuning gap and amplitude and phase continuity for sensing and wireless communications in accordance with aspects of the present disclosure.

FIG. 13 shows a block diagram 1300 of a communications manager 1305 that supports configuring a retuning gap and amplitude and phase continuity for sensing and wireless communications in accordance with aspects of the present disclosure. The communications manager 1305 may be an example of aspects of a communications manager 1115, a communications manager 1215, or a communications manager 1410 described herein. The communications manager 1305 may include an inter-pulse interval manager 1310, a TDM manager 1315, a wireless communications manager 1320, a retuning manager 1325, a phase and amplitude continuity manager 1330, a sensing manager 1335, and a capability manager 1340. Each of these modules may communicate, directly or indirectly, with one another (e.g., via one or more buses).

In some implementations, the communications manager 1305 may determine whether an inter-pulse interval between a first sensing signal pulse and a second sensing signal pulse is long enough to support retuning of a radio frequency chain of a UE for wireless communications during the inter-pulse interval.

The inter-pulse interval manager 1310 may identify an inter-pulse interval between a first sensing signal pulse and a second sensing signal pulse. In some examples, the inter-pulse interval manager 1310 may determine that the duration of the inter-pulse interval satisfies a threshold, where performing wireless communications with the UE during the inter-pulse interval is based on the duration of the inter-pulse interval satisfying the threshold. In some examples, the inter-pulse interval manager 1310 may determine that the duration of the inter-pulse interval fails to satisfy a threshold, where performing wireless communications with the UE outside of the inter-pulse interval is based on the duration of the inter-pulse interval failing to satisfy the threshold.

The TDM manager 1315 may transmit, to a UE, a configuration for TDM of sensing signals with wireless communications with the UE within a shared spectrum, the configuration including the inter-pulse interval between the first sensing signal pulse and the second sensing signal pulse. The wireless communications manager 1320 may perform wireless communications with the UE either during the inter-pulse interval or outside of the inter-pulse interval based on a duration of the inter-pulse interval.

The retuning manager 1325 may transmit, to the UE, an indication of a first retuning gap for retuning a radio frequency chain of the UE from the first sensing signal pulse to wireless communications and a second retuning gap for retuning the radio frequency chain of the UE from wireless communications to the second sensing signal pulse. In some cases, the first retuning gap is longer than the second retuning gap. In some cases, the first retuning gap is three milliseconds or three slots. In some cases, the second retuning gap is zero milliseconds or zero slots.

In some other implementations, the communications manager 1305 may determine whether multiple adjacent or consecutive sensing signal pulses have phase and amplitude continuity and may participate in a sensing procedure including the multiple adjacent or consecutive sensing signal pulses accordingly.

In some examples, the TDM manager 1315 may transmit, to a UE, a configuration for TDM of sensing signals with wireless communications with the UE within a shared spectrum, the configuration including the phase and amplitude continuity status of the at least two adjacent sensing signal pulses.

The phase and amplitude continuity manager 1330 may determine a phase and amplitude continuity status of at least two adjacent sensing signal pulses, where the phase and amplitude continuity status is indicative of the at least two adjacent sensing signal pulses either having phase and amplitude continuity or not having phase and amplitude continuity. In some examples, the phase and amplitude continuity manager 1330 may determine the phase and amplitude continuity status of a set of adjacent sensing signal pulses, where the set of adjacent sensing signal pulses includes the at least two adjacent sensing signal pulses.

In some examples, the wireless communications manager 1320 may perform wireless communications with the UE between the at least two adjacent sensing signal pulses. In some examples, the phase and amplitude continuity manager 1330 may determine the phase and amplitude continuity status of the at least two adjacent sensing signal pulses based on performing wireless communications with the UE between the at least two adjacent sensing signal pulses and one or more parameters of wireless communications. In some cases, the one or more parameters of wireless communications include one or more of a transmit power of wireless communications, a bandwidth of wireless communications, a waveform of wireless communications, a duration of wireless communications, and a time difference between wireless communications and a next sensing signal pulse.

The sensing manager 1335 may participate in sensing operations that include the at least two adjacent sensing signal pulses based on the phase and amplitude continuity status.

The capability manager 1340 may receive, from the UE, a capability of the UE for the at least two adjacent sensing signal pulses to have phase and amplitude continuity, where the phase and amplitude continuity status is based on the capability of the UE for the at least two adjacent sensing signal pulses to have phase and amplitude continuity. In some cases, the capability of the UE for the at least two adjacent sensing signal pulses to have phase and amplitude continuity is based on one or both of an inter-pulse interval between the at least two adjacent sensing signal pulses and a presence of wireless communications between the at least two adjacent sensing signal pulses.

Figure 14:
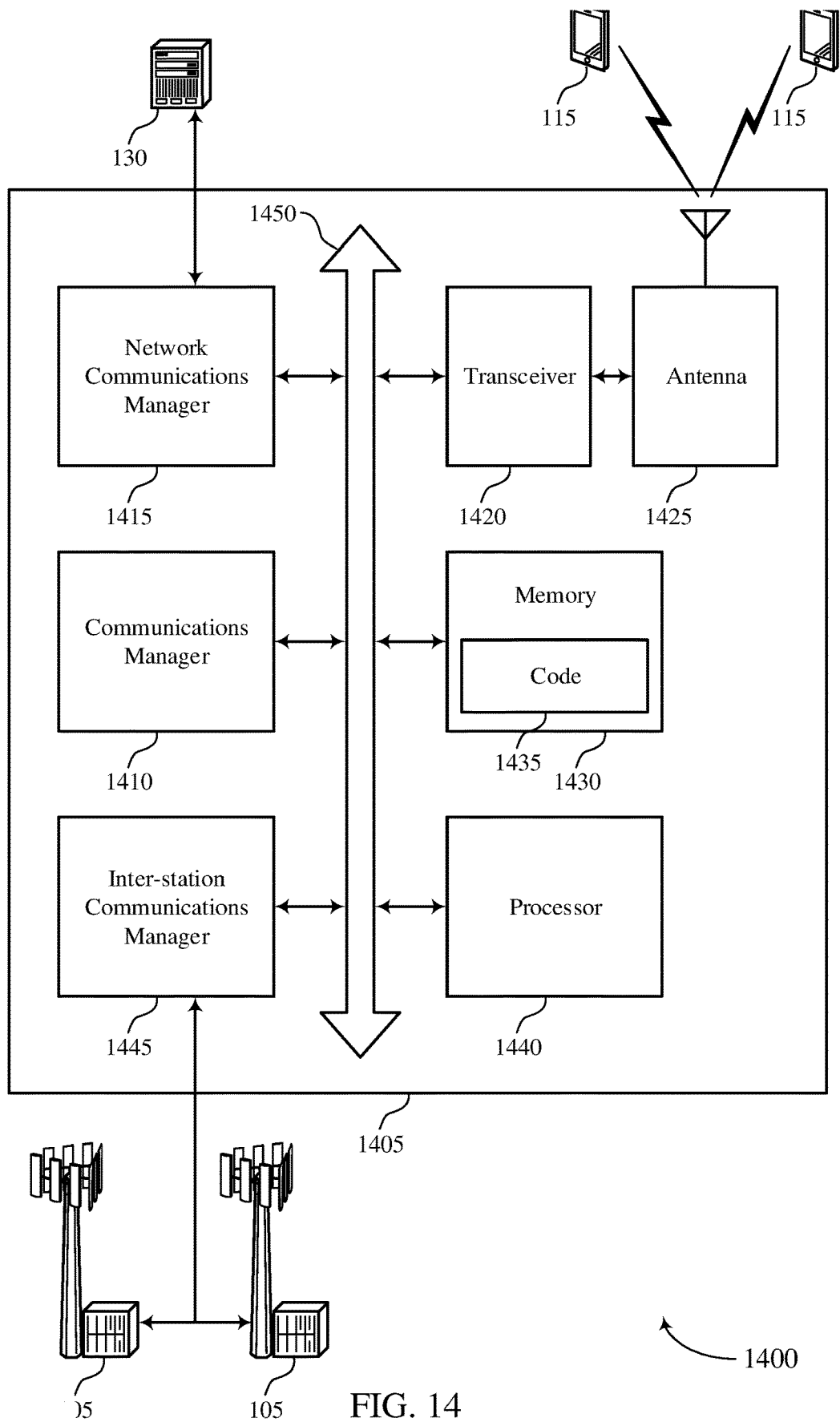
FIG. 14 shows a diagram of a system including a device that supports configuring a retuning gap and amplitude and phase continuity for sensing and wireless communications in accordance with aspects of the present disclosure.

FIG. 14 shows a diagram of a system 1400 including a device 1405 that supports configuring a retuning gap and amplitude and phase continuity for sensing and wireless communications in accordance with aspects of the present disclosure. The device 1405 may be an example of or include the components of device 1105, device 1205, or a base station 105 as described herein. The device 1405 may include components for bi-*d*irectional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

In some implementations, the communications manager 1410 may identify an inter-pulse interval between a first sensing signal pulse and a second sensing signal pulse, transmit, to a UE, a configuration for TDM of sensing signals with wireless communications with the UE within a shared spectrum, the configuration including the inter-pulse interval between the first sensing signal pulse and the second sensing signal pulse, and perform wireless communications with the UE either during the inter-pulse interval or outside of the inter-pulse interval based on a duration of the inter-pulse interval.

In some other implementations, the communications manager 1410 may determine a phase and amplitude continuity status of at least two adjacent sensing signal pulses, where the phase and amplitude continuity status is indicative of the at least two adjacent sensing signal pulses either having phase and amplitude continuity or not having phase and amplitude continuity, transmit, to a UE, a configuration for TDM of sensing signals with wireless communications with the UE within a shared spectrum, the configuration including the phase and amplitude continuity status of the at least two adjacent sensing signal pulses, and participate in sensing operations that include the at least two adjacent sensing signal pulses based on the phase and amplitude continuity status.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-*d*irectionally, via one or more antennas, wired, or wireless links as described herein. For example, the transceiver 1420 may represent a wireless transceiver and may communicate bi-*d*irectionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting configuring a retuning gap and amplitude and phase continuity for sensing and wireless communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
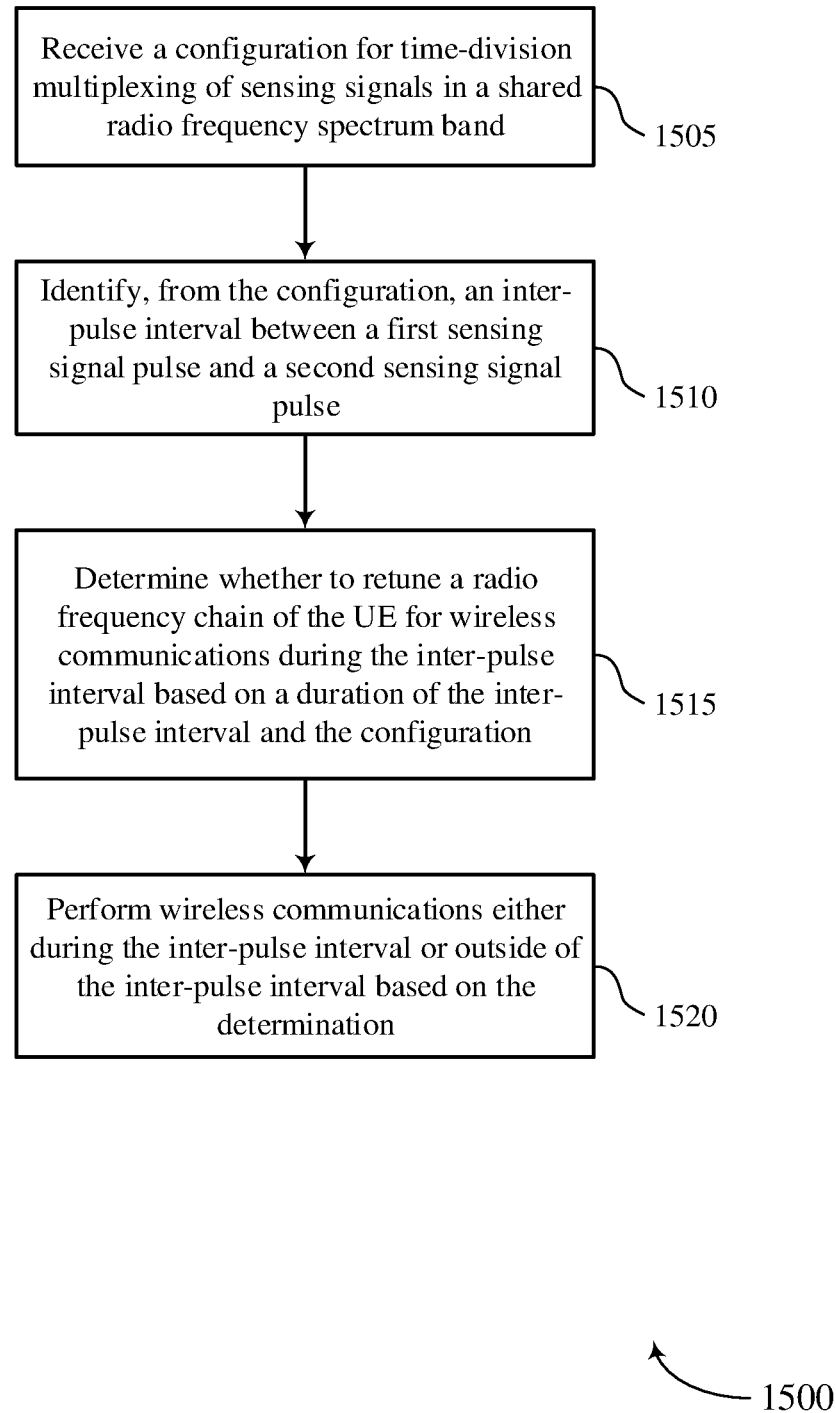
FIGS. 15 through 22 show flowcharts illustrating methods that support configuring a retuning gap and amplitude and phase continuity for sensing and wireless communications in accordance with aspects of the present disclosure.

FIG. 15 shows a flowchart illustrating a method 1500 that supports configuring a retuning gap and amplitude and phase continuity for sensing and wireless communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive a configuration for TDM of sensing signals in a shared radio frequency spectrum band.

The operations of 1505 may be performed according to the methods described herein. In some examples, aspects of the operations of 1505 may be performed by a TDM manager as described with reference to FIGS. 7 through 10.

At 1510, the UE may identify, from the configuration, an inter-pulse interval between a first sensing signal pulse and a second sensing signal pulse. The operations of 1510 may be performed according to the methods described herein. In some examples, aspects of the operations of 1510 may be performed by an inter-pulse interval manager as described with reference to FIGS. 7 through 10.

At 1515, the UE may determine whether to retune a radio frequency chain of the UE for wireless communications during the inter-pulse interval based on a duration of the inter-pulse interval and the configuration. The operations of 1515 may be performed according to the methods described herein. In some examples, aspects of the operations of 1515 may be performed by a retuning manager as described with reference to FIGS. 7 through 10.

At 1520, the UE may perform wireless communications either during the inter-pulse interval or outside of the inter-pulse interval based on the determination. The operations of 1520 may be performed according to the methods described herein. In some examples, aspects of the operations of 1520 may be performed by a wireless communications manager as described with reference to FIGS. 7 through 10.

Figure 16:
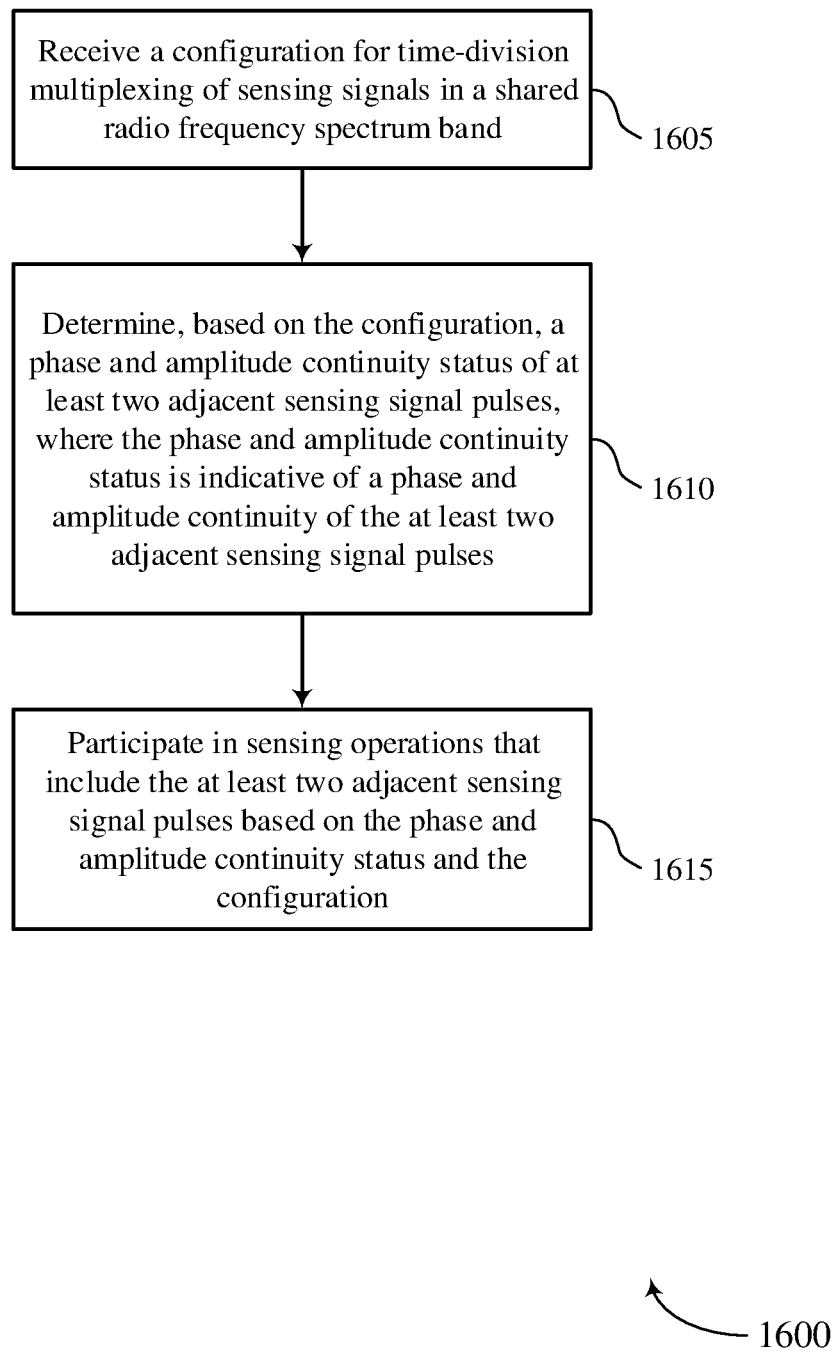

FIG. 16 shows a flowchart illustrating a method 1600 that supports configuring a retuning gap and amplitude and phase continuity for sensing and wireless communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive a configuration for TDM of sensing signals in a shared radio frequency spectrum band. The operations of 1605 may be performed according to the methods described herein. In some examples, aspects of the operations of 1605 may be performed by a TDM manager as described with reference to FIGS. 7 through 10.

At 1610, the UE may determine, based on the configuration, a phase and amplitude continuity status of at least two adjacent sensing signal pulses, where the phase and amplitude continuity status is indicative of a phase and amplitude continuity of the at least two adjacent sensing signal pulses. The operations of 1610 may be performed according to the methods described herein. In some examples, aspects of the operations of 1610 may be performed by a phase and amplitude continuity manager as described with reference to FIGS. 7 through 10.

At 1615, the UE may participate in sensing operations that include the at least two adjacent sensing signal pulses based on the phase and amplitude continuity status and the configuration. The operations of 1615 may be performed according to the methods described herein. In some examples, aspects of the operations of 1615 may be performed by a sensing manager as described with reference to FIGS. 7 through 10.

Figure 17:
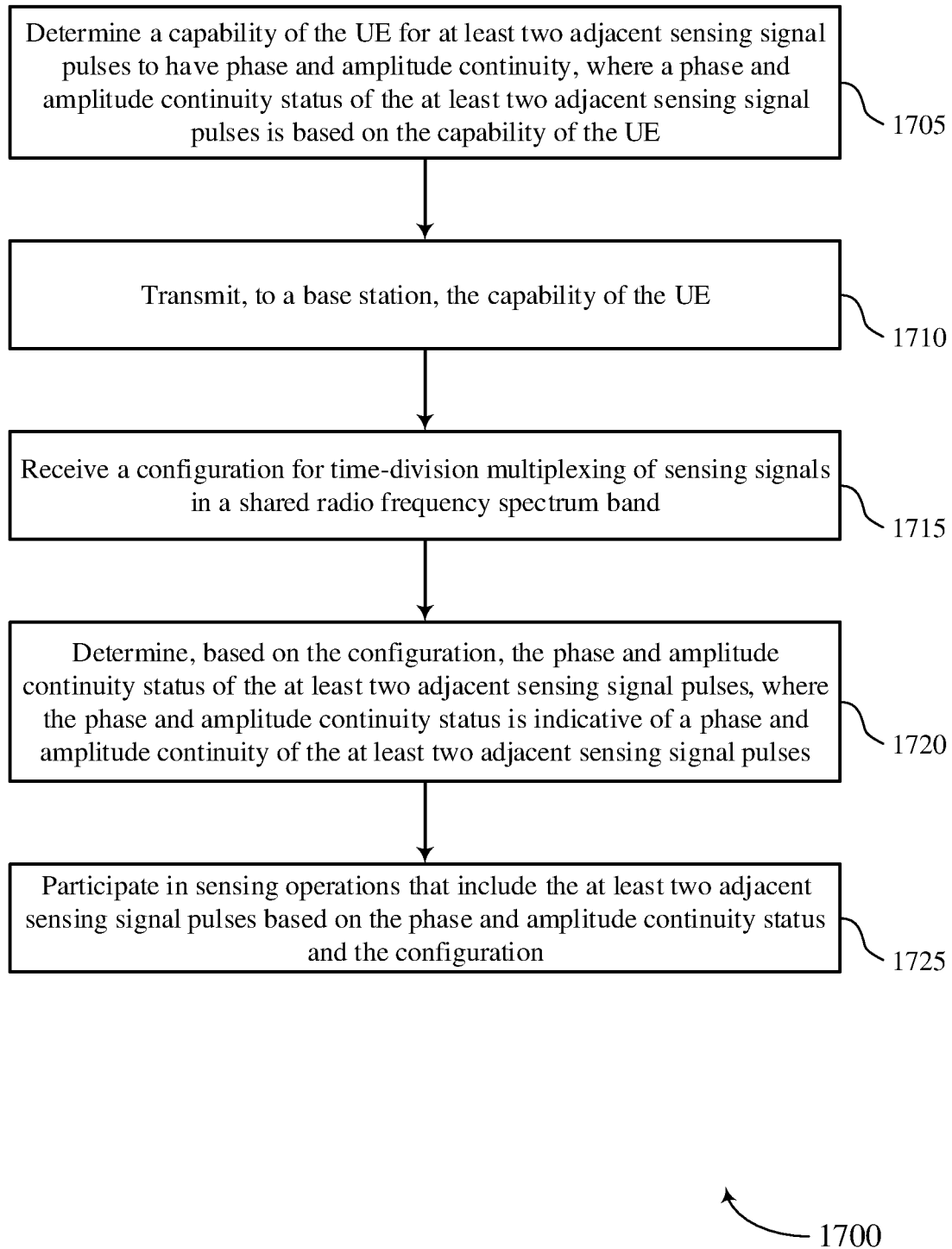

FIG. 17 shows a flowchart illustrating a method 1700 that supports configuring a retuning gap and amplitude and phase continuity for sensing and wireless communications in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may determine a capability of the UE for at least two adjacent sensing signal pulses to have phase and amplitude continuity, where a phase and amplitude continuity status of the at least two adjacent sensing signal pulses is based on the capability of the UE. The operations of 1705 may be performed according to the methods described herein. In some examples, aspects of the operations of 1705 may be performed by a capability manager as described with reference to FIGS. 7 through 10.

At 1710, the UE may transmit, to a base station, the capability of the UE. The operations of 1710 may be performed according to the methods described herein. In some examples, aspects of the operations of 1710 may be performed by a capability manager as described with reference to FIGS. 7 through 10.

At 1715, the UE may receive a configuration for TDM of sensing signals in a shared radio frequency spectrum band. The operations of 1715 may be performed according to the methods described herein. In some examples, aspects of the operations of 1715 may be performed by a TDM manager as described with reference to FIGS. 7 through 10.

At 1720, the UE may determine, based on the configuration, the phase and amplitude continuity status of the at least two adjacent sensing signal pulses, where the phase and amplitude continuity status is indicative of a phase and amplitude continuity of the at least two adjacent sensing signal pulses. The operations of 1720 may be performed according to the methods described herein. In some examples, aspects of the operations of 1720 may be performed by a phase and amplitude continuity manager as described with reference to FIGS. 7 through 10.

At 1725, the UE may participate in sensing operations that include the at least two adjacent sensing signal pulses based on the phase and amplitude continuity status and the configuration. The operations of 1725 may be performed according to the methods described herein. In some examples, aspects of the operations of 1725 may be performed by a sensing manager as described with reference to FIGS. 7 through 10.

Figure 18:
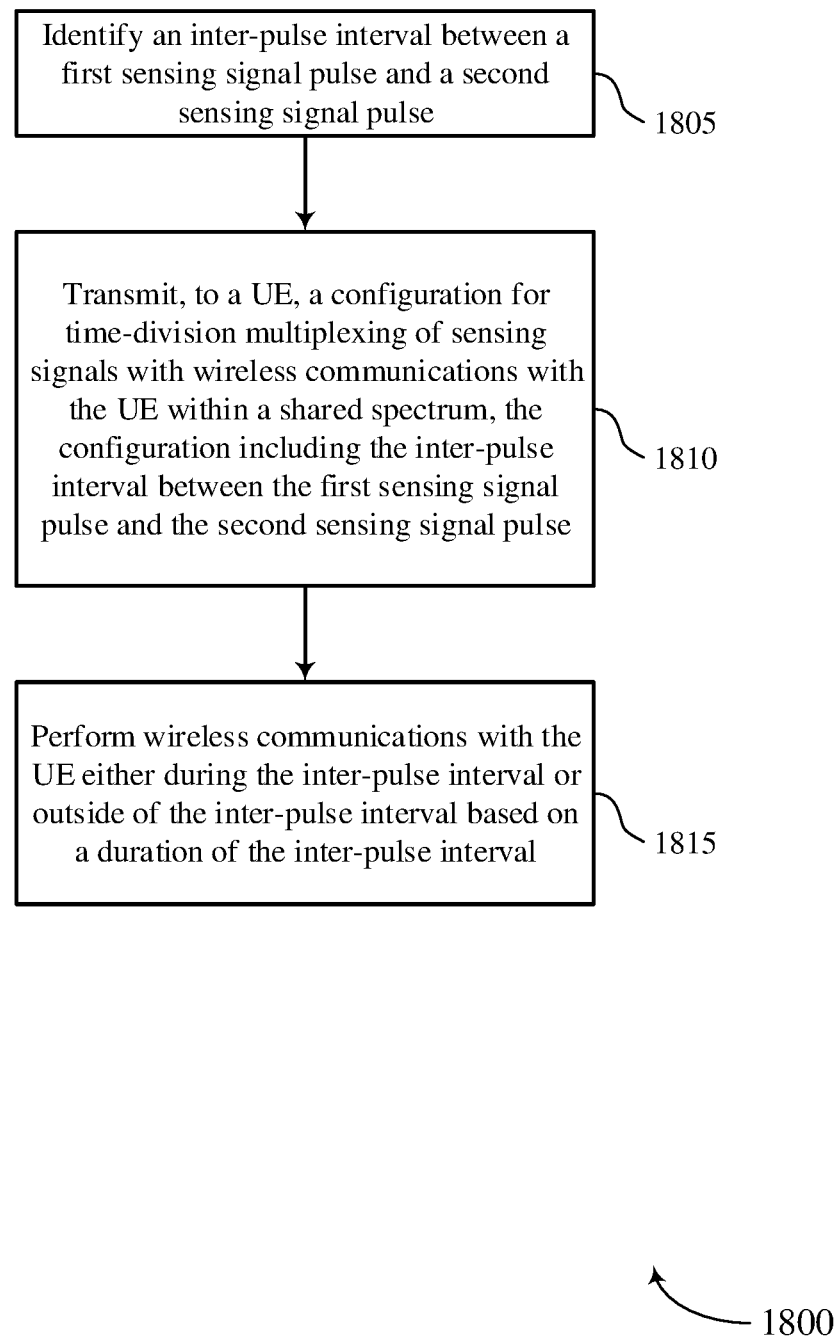

FIG. 18 shows a flowchart illustrating a method 1800 that supports configuring a retuning gap and amplitude and phase continuity for sensing and wireless communications in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may identify an inter-pulse interval between a first sensing signal pulse and a second sensing signal pulse. The operations of 1805 may be performed according to the methods described herein. In some examples, aspects of the operations of 1805 may be performed by an inter-pulse interval manager as described with reference to FIGS. 11 through 14.

At 1810, the base station may transmit, to a UE, a configuration for TDM of sensing signals with wireless communications with the UE within a shared spectrum, the configuration including the inter-pulse interval between the first sensing signal pulse and the second sensing signal pulse. The operations of 1810 may be performed according to the methods described herein. In some examples, aspects of the operations of 1810 may be performed by a TDM manager as described with reference to FIGS. 11 through 14.

At 1815, the base station may perform wireless communications with the UE either during the inter-pulse interval or outside of the inter-pulse interval based on a duration of the inter-pulse interval. The operations of 1815 may be performed according to the methods described herein. In some examples, aspects of the operations of 1815 may be performed by a wireless communications manager as described with reference to FIGS. 11 through 14.

Figure 19:
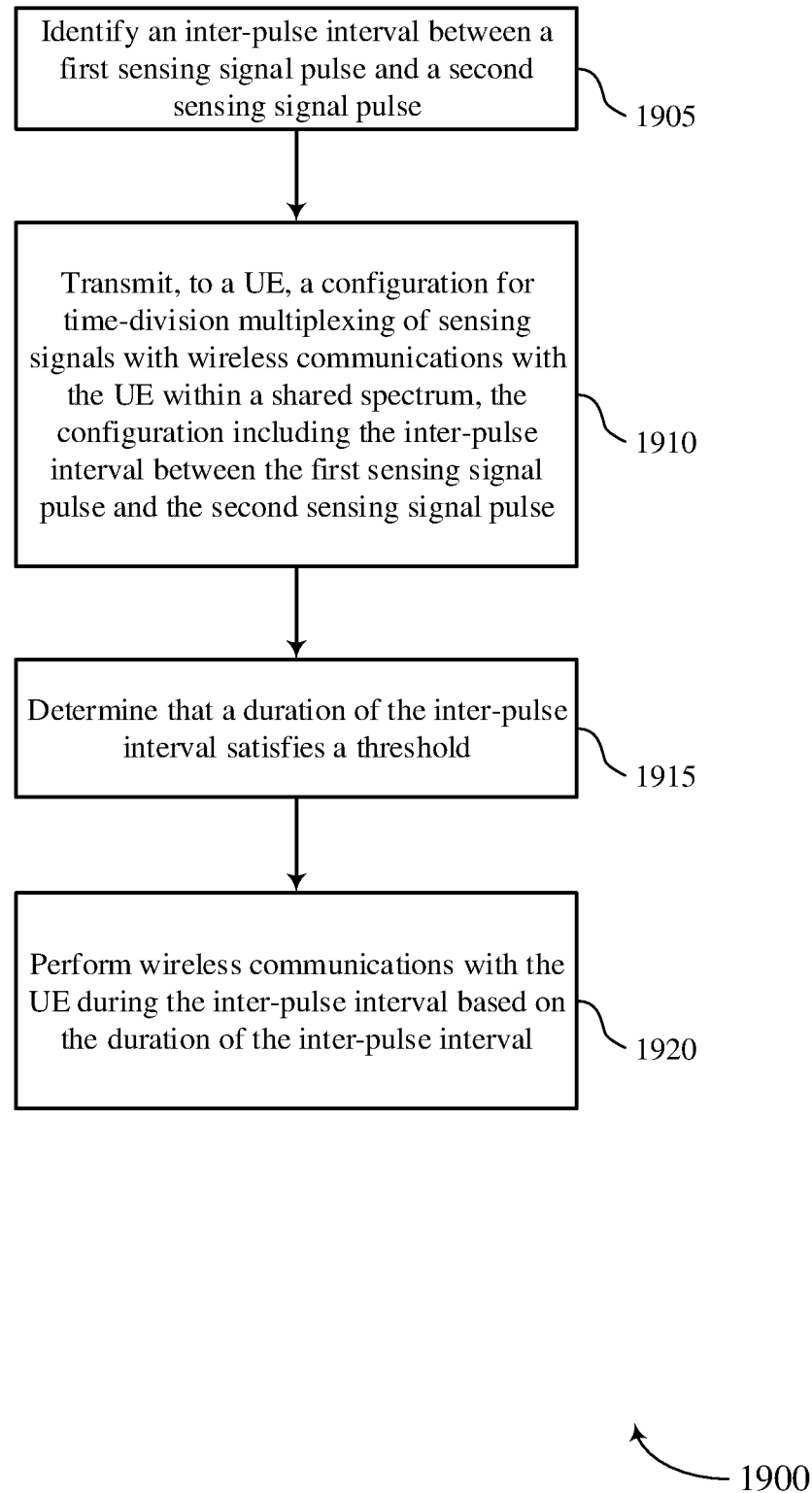

FIG. 19 shows a flowchart illustrating a method 1900 that supports configuring a retuning gap and amplitude and phase continuity for sensing and wireless communications in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1905, the base station may identify an inter-pulse interval between a first sensing signal pulse and a second sensing signal pulse. The operations of 1905 may be performed according to the methods described herein. In some examples, aspects of the operations of 1905 may be performed by an inter-pulse interval manager as described with reference to FIGS. 11 through 14.

At 1910, the base station may transmit, to a UE, a configuration for TDM of sensing signals with wireless communications with the UE within a shared spectrum, the configuration including the inter-pulse interval between the first sensing signal pulse and the second sensing signal pulse. The operations of 1910 may be performed according to the methods described herein. In some examples, aspects of the operations of 1910 may be performed by a TDM manager as described with reference to FIGS. 11 through 14.

At 1915, the base station may determine that a duration of the inter-pulse interval satisfies a threshold. The operations of 1915 may be performed according to the methods described herein. In some examples, aspects of the operations of 1915 may be performed by an inter-pulse interval manager as described with reference to FIGS. 11 through 14.

At 1920, the base station may perform wireless communications with the UE during the inter-pulse interval based on the duration of the inter-pulse interval. The operations of 1920 may be performed according to the methods described herein. In some examples, aspects of the operations of 1920 may be performed by a wireless communications manager as described with reference to FIGS. 11 through 14.

Figure 20:
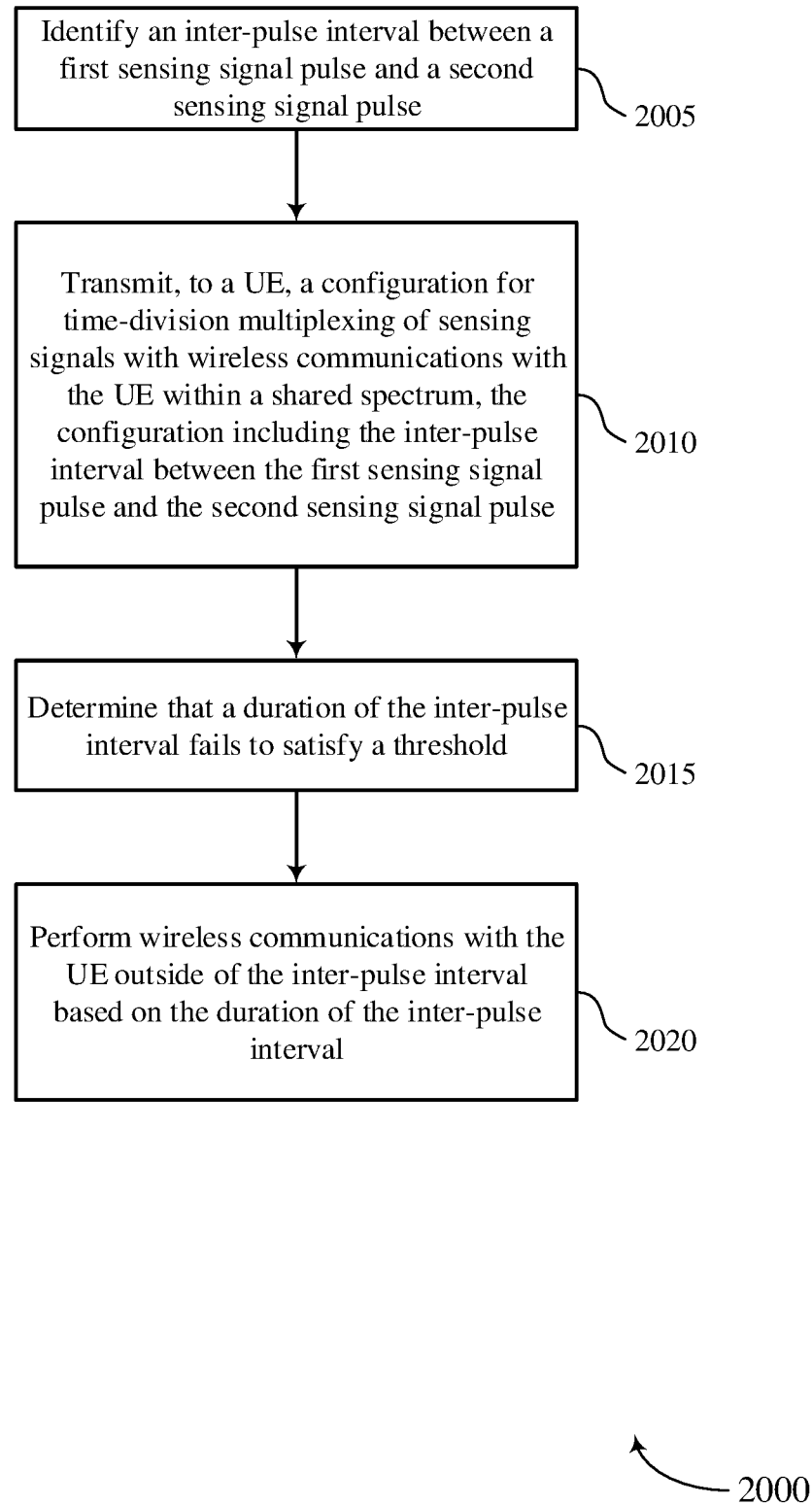

FIG. 20 shows a flowchart illustrating a method 2000 that supports configuring a retuning gap and amplitude and phase continuity for sensing and wireless communications in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2005, the base station may identify an inter-pulse interval between a first sensing signal pulse and a second sensing signal pulse. The operations of 2005 may be performed according to the methods described herein. In some examples, aspects of the operations of 2005 may be performed by an inter-pulse interval manager as described with reference to FIGS. 11 through 14.

At 2010, the base station may transmit, to a UE, a configuration for TDM of sensing signals with wireless communications with the UE within a shared spectrum, the configuration including the inter-pulse interval between the first sensing signal pulse and the second sensing signal pulse. The operations of 2010 may be performed according to the methods described herein. In some examples, aspects of the operations of 2010 may be performed by a TDM manager as described with reference to FIGS. 11 through 14.

At 2015, the base station may determine that a duration of the inter-pulse interval fails to satisfy a threshold. The operations of 2015 may be performed according to the methods described herein. In some examples, aspects of the operations of 2015 may be performed by an inter-pulse interval manager as described with reference to FIGS. 11 through 14.

At 2020, the base station may perform wireless communications with the UE outside of the inter-pulse interval based on the duration of the inter-pulse interval. The operations of 2020 may be performed according to the methods described herein. In some examples, aspects of the operations of 2020 may be performed by a wireless communications manager as described with reference to FIGS. 11 through 14.

Figure 21:
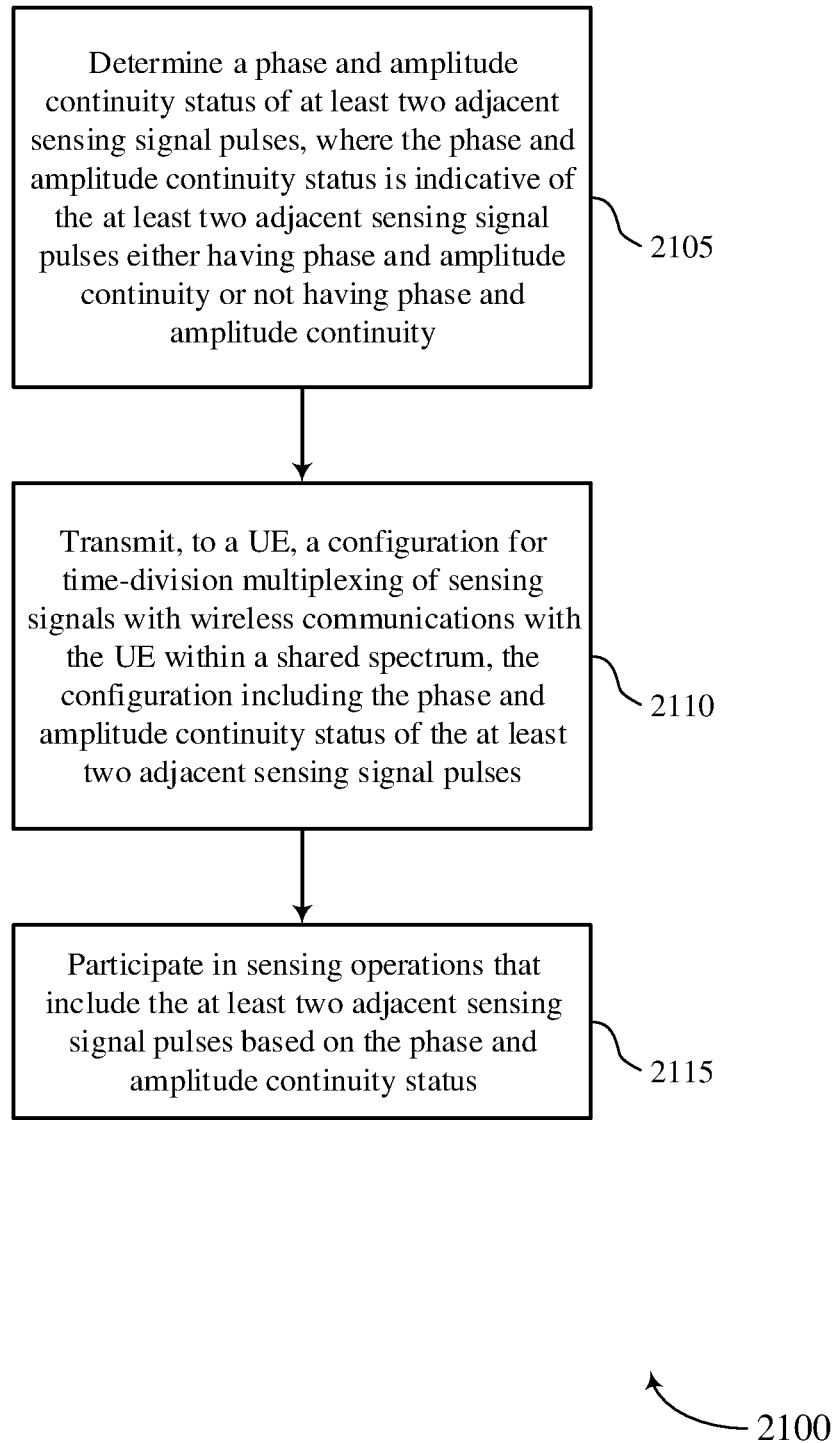

FIG. 21 shows a flowchart illustrating a method 2100 that supports configuring a retuning gap and amplitude and phase continuity for sensing and wireless communications in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2105, the base station may determine a phase and amplitude continuity status of at least two adjacent sensing signal pulses, where the phase and amplitude continuity status is indicative of the at least two adjacent sensing signal pulses either having phase and amplitude continuity or not having phase and amplitude continuity. The operations of 2105 may be performed according to the methods described herein. In some examples, aspects of the operations of 2105 may be performed by a phase and amplitude continuity manager as described with reference to FIGS. 11 through 14.

At 2110, the base station may transmit, to a UE, a configuration for TDM of sensing signals with wireless communications with the UE within a shared spectrum, the configuration including the phase and amplitude continuity status of the at least two adjacent sensing signal pulses. The operations of 2110 may be performed according to the methods described herein. In some examples, aspects of the operations of 2110 may be performed by a TDM manager as described with reference to FIGS. 11 through 14.

At 2115, the base station may participate in sensing operations that include the at least two adjacent sensing signal pulses based on the phase and amplitude continuity status. The operations of 2115 may be performed according to the methods described herein. In some examples, aspects of the operations of 2115 may be performed by a sensing manager as described with reference to FIGS. 11 through 14.

Figure 22:
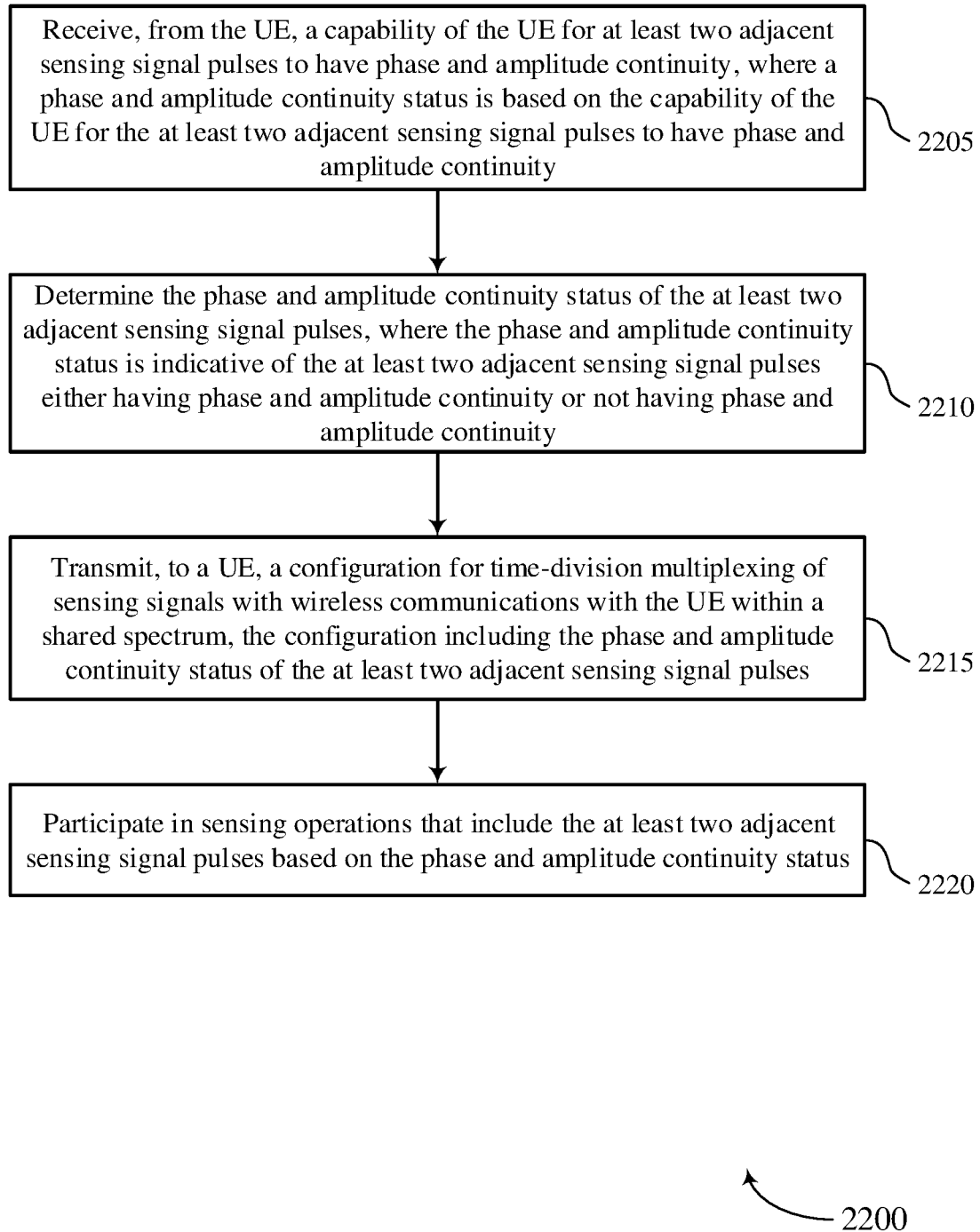

FIG. 22 shows a flowchart illustrating a method 2200 that supports configuring a retuning gap and amplitude and phase continuity for sensing and wireless communications in accordance with aspects of the present disclosure. The operations of method 2200 may be implemented by a base station 105 or its components as described herein. For example, the operations of method 2200 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2205, the base station may receive, from the UE, a capability of the UE for at least two adjacent sensing signal pulses to have phase and amplitude continuity, where a phase and amplitude continuity status is based on the capability of the UE for the at least two adjacent sensing signal pulses to have phase and amplitude continuity. The operations of 2205 may be performed according to the methods described herein. In some examples, aspects of the operations of 2205 may be performed by a capability manager as described with reference to FIGS. 11 through 14.

At 2210, the base station may determine the phase and amplitude continuity status of the at least two adjacent sensing signal pulses, where the phase and amplitude continuity status is indicative of the at least two adjacent sensing signal pulses either having phase and amplitude continuity or not having phase and amplitude continuity. The operations of 2210 may be performed according to the methods described herein. In some examples, aspects of the operations of 2210 may be performed by a phase and amplitude continuity manager as described with reference to FIGS. 11 through 14.

At 2215, the base station may transmit, to a UE, a configuration for TDM of sensing signals with wireless communications with the UE within a shared spectrum, the configuration including the phase and amplitude continuity status of the at least two adjacent sensing signal pulses. The operations of 2215 may be performed according to the methods described herein. In some examples, aspects of the operations of 2215 may be performed by a TDM manager as described with reference to FIGS. 11 through 14.

At 2220, the base station may participate in sensing operations that include the at least two adjacent sensing signal pulses based on the phase and amplitude continuity status. The operations of 2220 may be performed according to the methods described herein. In some examples, aspects of the operations of 2220 may be performed by a sensing manager as described with reference to FIGS. 11 through 14.

Example 1: A method for wireless communications at a UE, comprising: receiving a configuration for TDM of sensing signals in a shared radio frequency spectrum band; identifying, from the configuration, an inter-pulse interval between a first sensing signal pulse and a second sensing signal pulse; determining whether to retune a radio frequency chain of the UE for wireless communications during the inter-pulse interval based at least in part on a duration of the inter-pulse interval and the configuration; and performing wireless communications either during the inter-pulse interval or outside of the inter-pulse interval based on the determination.

Example 2: The method of example 1, wherein determining whether to retune the radio frequency chain of the UE comprises: determining that the duration of the inter-pulse interval satisfies a threshold, wherein performing wireless communications during the inter-pulse interval is based at least in part on the duration of the inter-pulse interval satisfying the threshold.

Example 3: The method of example 1, wherein determining whether to retune the radio frequency chain of the UE comprises: determining that the duration of the inter-pulse interval fails to satisfy a threshold, wherein performing wireless communications outside of the inter-pulse interval is based at least in part on the duration of the inter-pulse interval failing to satisfy the threshold.

Example 4: The method of any of examples 1 or 2, wherein wireless communications are performed during the inter-pulse interval, the method further comprising: retuning the radio frequency chain from the first sensing signal pulse to wireless communications during a first retuning gap; and retuning the radio frequency chain from wireless communications to the second sensing signal pulse during a second retuning gap.

Example 5: The method of example 4, further comprising: receiving, from a base station, an indication of the first retuning gap and the second retuning gap.

Example 6: The method of any of examples 4 or 5, further comprising: determining the first retuning gap and the second retuning gap based at least in part on a pre-configured rule of the UE.

Example 7: The method of any of examples 4 to 6, further comprising: determining the first retuning gap and the second retuning gap based at least in part on a capability of the UE.

Example 8: The method of example 7, further comprising: transmitting, to a base station, an indication of the capability of the UE.

Example 9: The method of any of examples 4 to 8, wherein the first retuning gap is longer than the second retuning gap.

Example 10: The method of any of examples 4 to 9, wherein the first retuning gap is three milliseconds or three slots.

Example 11: The method of any of examples 4 to 10, wherein the second retuning gap is zero milliseconds or zero slots.

Example 12: A method for wireless communications at a UE, comprising: receiving a configuration for TDM of sensing signals in a shared radio frequency spectrum band; determining, based at least in part on the configuration, a phase and amplitude continuity status of at least two adjacent sensing signal pulses, wherein the phase and amplitude continuity status is indicative of a phase and amplitude continuity of the at least two adjacent sensing signal pulses; and participating in sensing operations that include the at least two adjacent sensing signal pulses based at least in part on the phase and amplitude continuity status and the configuration.

Example 13: The method of example 12, further comprising: determining a capability of the UE for the at least two adjacent sensing signal pulses to have phase and amplitude continuity, wherein the phase and amplitude continuity status of the at least two adjacent sensing signal pulses is based at least in part on the capability of the UE; and transmitting, to a base station, the capability of the UE.

Example 14: The method of example 13, wherein the capability of the UE for the at least two adjacent sensing signal pulses to have phase and amplitude continuity is based at least in part on one or both of an inter-pulse interval between the at least two adjacent sensing signal pulses and a presence of wireless communications between the at least two adjacent sensing signal pulses.

Example 15: The method of any of examples 12 to 14, further comprising: performing wireless communications between the at least two adjacent sensing signal pulses.

Example 16: The method of example 15, wherein determining the phase and amplitude continuity status of the at least two adjacent sensing signal pulses comprises: determining the phase and amplitude continuity status of the at least two adjacent sensing signal pulses based at least in part on performing wireless communications between the at least two adjacent sensing signal pulses and one or more parameters of wireless communications.

Example 17: The method of example 16, wherein the one or more parameters of wireless communications comprise one or more of a transmit power of wireless communications, a bandwidth of wireless communications, a waveform of wireless communications, a duration of wireless communications, and a time difference between wireless communications and a next sensing signal pulse.

Example 18: The method of any of examples 12 to 17, wherein determining the phase and amplitude continuity status of the at least two adjacent sensing signal pulses comprises: determining, based at least in part on the configuration, the phase and amplitude continuity status of a set of adjacent sensing signal pulses, wherein the set of adjacent sensing signal pulses comprises the at least two adjacent sensing signal pulses.

Example 19: A method for wireless communications at a base station, comprising: identifying an inter-pulse interval between a first sensing signal pulse and a second sensing signal pulse; transmitting, to a UE, a configuration for TDM of sensing signals with wireless communications with the UE within a shared spectrum, the configuration including the inter-pulse interval between the first sensing signal pulse and the second sensing signal pulse; and performing wireless communications with the UE either during the inter-pulse interval or outside of the inter-pulse interval based at least in part on a duration of the inter-pulse interval.

Example 20: The method of example 19, further comprising: determining that the duration of the inter-pulse interval satisfies a threshold, wherein performing wireless communications with the UE during the inter-pulse interval is based at least in part on the duration of the inter-pulse interval satisfying the threshold.

Example 21: The method of example 19, further comprising: determining that the duration of the inter-pulse interval fails to satisfy a threshold, wherein performing wireless communications with the UE outside of the inter-pulse interval is based at least in part on the duration of the inter-pulse interval failing to satisfy the threshold.

Example 22: The method of any of examples 19 or 20, wherein wireless communications with the UE are performed during the inter-pulse interval, the method further comprising: transmitting, to the UE, an indication of a first retuning gap for retuning a radio frequency chain of the UE from the first sensing signal pulse to wireless communications and a second retuning gap for retuning the radio frequency chain of the UE from wireless communications to the second sensing signal pulse.

Example 23: The method of example 22, wherein the first retuning gap is longer than the second retuning gap.

Example 24: The method of any of examples 22 or 23, wherein the first retuning gap is three milliseconds or three slots.

Example 25: The method of any of examples 22 to 24, wherein the second retuning gap is zero milliseconds or zero slots.

Example 26: A method for wireless communications at a base station, comprising: determining a phase and amplitude continuity status of at least two adjacent sensing signal pulses, wherein the phase and amplitude continuity status is indicative of the at least two adjacent sensing signal pulses either having phase and amplitude continuity or not having phase and amplitude continuity; transmitting, to a UE, a configuration for TDM of sensing signals with wireless communications with the UE within a shared spectrum, the configuration including the phase and amplitude continuity status of the at least two adjacent sensing signal pulses; and participating in sensing operations that include the at least two adjacent sensing signal pulses based at least in part on the phase and amplitude continuity status.

Example 27: The method of example 26, further comprising: receiving, from the UE, a capability of the UE for the at least two adjacent sensing signal pulses to have phase and amplitude continuity, wherein the phase and amplitude continuity status is based at least in part on the capability of the UE for the at least two adjacent sensing signal pulses to have phase and amplitude continuity.

Example 28: The method of example 27, wherein the capability of the UE for the at least two adjacent sensing signal pulses to have phase and amplitude continuity is based at least in part on one or both of an inter-pulse interval between the at least two adjacent sensing signal pulses and a presence of wireless communications between the at least two adjacent sensing signal pulses.

Example 29: The method of any of examples 26 to 28, further comprising: performing wireless communications with the UE between the at least two adjacent sensing signal pulses.

Example 30: The method of example 29, wherein determining the phase and amplitude continuity status of the at least two adjacent sensing signal pulses comprises: determining the phase and amplitude continuity status of the at least two adjacent sensing signal pulses based at least in part on performing wireless communications with the UE between the at least two adjacent sensing signal pulses and one or more parameters of wireless communications.

Example 31: The method of example 30, wherein the one or more parameters of wireless communications comprise one or more of a transmit power of wireless communications, a bandwidth of wireless communications, a waveform of wireless communications, a duration of wireless communications, and a time difference between wireless communications and a next sensing signal pulse.

Example 32: The method of any of examples 26 to 31, wherein determining the phase and amplitude continuity status of the at least two adjacent sensing signal pulses comprises: determining the phase and amplitude continuity status of a set of adjacent sensing signal pulses, wherein the set of adjacent sensing signal pulses comprises the at least two adjacent sensing signal pulses.

Example 33: An apparatus comprising at least one means for performing a method of any of examples 1 to 11.

Example 34: An apparatus for wireless communications comprising a processor; memory coupled with the processor; and instructions stored in the memory and executable by the processor to cause the apparatus to perform a method of any of examples 1 to 11.

Example 35: A non-transitory computer-readable medium storing code for wireless communications, the code comprising instructions executable by a processor to perform a method of any of examples 1 to 11.

Example 36: An apparatus comprising at least one means for performing a method of any of examples 12 to 18.

Example 37: An apparatus for wireless communications comprising a processor; memory coupled with the processor; and instructions stored in the memory and executable by the processor to cause the apparatus to perform a method of any of examples 12 to 18.

Example 38: A non-transitory computer-readable medium storing code for wireless communications, the code comprising instructions executable by a processor to perform a method of any of examples 12 to 18.

Example 39: An apparatus comprising at least one means for performing a method of any of examples 19 to 25.

Example 40: An apparatus for wireless communications comprising a processor; memory coupled with the processor; and instructions stored in the memory and executable by the processor to cause the apparatus to perform a method of any of examples 19 to 25.

Example 41: A non-transitory computer-readable medium storing code for wireless communications, the code comprising instructions executable by a processor to perform a method of any of examples 19 to 25.

Example 42: An apparatus comprising at least one means for performing a method of any of examples 26 to 32.

Example 43: An apparatus for wireless communications comprising a processor; memory coupled with the processor; and instructions stored in the memory and executable by the processor to cause the apparatus to perform a method of any of examples 26 to 32.

Example 44: A non-transitory computer-readable medium storing code for wireless communications, the code comprising instructions executable by a processor to perform a method of any of examples 26 to 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a configuration for time-division multiplexing of sensing signals in a shared radio frequency spectrum band;
   identifying, from the configuration, an inter-pulse interval between a first sensing signal pulse and a second sensing signal pulse;
   determining whether to retune a radio frequency chain of the UE for wireless communications during the inter-pulse interval based at least in part on a duration of the inter-pulse interval and the configuration, wherein determining whether to retune comprises determining that the duration of the inter-pulse interval satisfies a threshold; and
   performing wireless communications either during the inter-pulse interval or outside of the inter-pulse interval based on the determination, wherein performing wireless communications during the inter-pulse interval is based at least in part on the duration of the inter-pulse interval satisfying the threshold.

2. The method of claim 1, wherein determining whether to retune the radio frequency chain of the UE comprises:
   determining that the duration of the inter-pulse interval fails to satisfy a threshold, wherein performing wireless communications outside of the inter-pulse interval is based at least in part on the duration of the inter-pulse interval failing to satisfy the threshold.

3. The method of claim 1, wherein wireless communications are performed during the inter-pulse interval, the method further comprising:
   retuning the radio frequency chain from the first sensing signal pulse to wireless communications during a first retuning gap; and
   retuning the radio frequency chain from wireless communications to the second sensing signal pulse during a second retuning gap.

4. The method of claim 3, further comprising:
   receiving, from a base station, an indication of the first retuning gap and the second retuning gap.

5. The method of claim 3, further comprising:
   determining the first retuning gap and the second retuning gap based at least in part on a pre-configured rule of the UE.

6. The method of claim 3, further comprising:
   determining the first retuning gap and the second retuning gap based at least in part on a capability of the UE.

7. The method of claim 6, further comprising:
   transmitting, to a base station, an indication of the capability of the UE.

8. The method of claim 3, wherein the first retuning gap is longer than the second retuning gap.

9. The method of claim 3, wherein the first retuning gap is three milliseconds or three slots.

10. The method of claim 3, wherein the second retuning gap is zero milliseconds or zero slots.

11. A method for wireless communications at a user equipment (UE), comprising:
    receiving a configuration for time-division multiplexing of sensing signals in a shared radio frequency spectrum band;
    determining, based at least in part on the configuration, a phase and amplitude continuity status of at least two adjacent sensing signal pulses, wherein the phase and amplitude continuity status is indicative of a phase and amplitude continuity of the at least two adjacent sensing signal pulses; and
    participating in sensing operations that include the at least two adjacent sensing signal pulses based at least in part on the phase and amplitude continuity status and the configuration.

12. The method of claim 11, further comprising:
    determining a capability of the UE for the at least two adjacent sensing signal pulses to have phase and amplitude continuity, wherein the phase and amplitude continuity status of the at least two adjacent sensing signal pulses is based at least in part on the capability of the UE; and
    transmitting, to a base station, the capability of the UE.

13. The method of claim 12, wherein the capability of the UE for the at least two adjacent sensing signal pulses to have phase and amplitude continuity is based at least in part on one or both of an inter-pulse interval between the at least two adjacent sensing signal pulses and a presence of wireless communications between the at least two adjacent sensing signal pulses.

14. The method of claim 11, further comprising:
    performing wireless communications between the at least two adjacent sensing signal pulses.

15. The method of claim 14, wherein determining the phase and amplitude continuity status of the at least two adjacent sensing signal pulses comprises:

determining the phase and amplitude continuity status of the at least two adjacent sensing signal pulses based at least in part on performing wireless communications between the at least two adjacent sensing signal pulses and one or more parameters of wireless communications.

16. The method of claim 15, wherein the one or more parameters of wireless communications comprise one or more of a transmit power of wireless communications, a bandwidth of wireless communications, a waveform of wireless communications, a duration of wireless communications, and a time difference between wireless communications and a next sensing signal pulse.

17. The method of claim 11, wherein determining the phase and amplitude continuity status of the at least two adjacent sensing signal pulses comprises:
determining, based at least in part on the configuration, the phase and amplitude continuity status of a set of adjacent sensing signal pulses, wherein the set of adjacent sensing signal pulses comprises the at least two adjacent sensing signal pulses.

18. A method for wireless communications at a base station, comprising:
identifying an inter-pulse interval between a first sensing signal pulse and a second sensing signal pulse;
determining that the duration of the inter-pulse interval satisfies a threshold;
transmitting, to a user equipment (UE), a configuration for time-division multiplexing of sensing signals with wireless communications with the UE within a shared spectrum, the configuration including the inter-pulse interval between the first sensing signal pulse and the second sensing signal pulse; and
performing wireless communications with the UE either during the inter-pulse interval or outside of the inter-pulse interval based at least in part on a duration of the inter-pulse interval, wherein performing wireless communications with the UE during the inter-pulse interval is based at least in part on the duration of the inter-pulse interval satisfying the threshold.

19. The method of claim 18, further comprising:
determining that the duration of the inter-pulse interval fails to satisfy a threshold, wherein performing wireless communications with the UE outside of the inter-pulse interval is based at least in part on the duration of the inter-pulse interval failing to satisfy the threshold.

20. The method of claim 18, wherein wireless communications with the UE are performed during the inter-pulse interval, the method further comprising:
transmitting, to the UE, an indication of a first retuning gap for retuning a radio frequency chain of the UE from the first sensing signal pulse to wireless communications and a second retuning gap for retuning the radio frequency chain of the UE from wireless communications to the second sensing signal pulse.

21. The method of claim 20, wherein the first retuning gap is longer than the second retuning gap.

22. The method of claim 20, wherein the first retuning gap is three milliseconds or three slots.

23. The method of claim 20, wherein the second retuning gap is zero milliseconds or zero slots.

24. A method for wireless communications at a base station, comprising:
determining a phase and amplitude continuity status of at least two adjacent sensing signal pulses, wherein the phase and amplitude continuity status is indicative of the at least two adjacent sensing signal pulses either having phase and amplitude continuity or not having phase and amplitude continuity;
transmitting, to a user equipment (UE), a configuration for time-division multiplexing of sensing signals with wireless communications with the UE within a shared spectrum, the configuration including the phase and amplitude continuity status of the at least two adjacent sensing signal pulses; and
participating in sensing operations that include the at least two adjacent sensing signal pulses based at least in part on the phase and amplitude continuity status.

25. The method of claim 24, further comprising:
receiving, from the UE, a capability of the UE for the at least two adjacent sensing signal pulses to have phase and amplitude continuity, wherein the phase and amplitude continuity status is based at least in part on the capability of the UE for the at least two adjacent sensing signal pulses to have phase and amplitude continuity.

26. The method of claim 25, wherein the capability of the UE for the at least two adjacent sensing signal pulses to have phase and amplitude continuity is based at least in part on one or both of an inter-pulse interval between the at least two adjacent sensing signal pulses and a presence of wireless communications between the at least two adjacent sensing signal pulses.

27. The method of claim 24, further comprising:
performing wireless communications with the UE between the at least two adjacent sensing signal pulses.

28. The method of claim 27, wherein determining the phase and amplitude continuity status of the at least two adjacent sensing signal pulses comprises:
determining the phase and amplitude continuity status of the at least two adjacent sensing signal pulses based at least in part on performing wireless communications with the UE between the at least two adjacent sensing signal pulses and one or more parameters of wireless communications.

29. The method of claim 28, wherein the one or more parameters of wireless communications comprise one or more of a transmit power of wireless communications, a bandwidth of wireless communications, a waveform of wireless communications, a duration of wireless communications, and a time difference between wireless communications and a next sensing signal pulse.

30. The method of claim 24, wherein determining the phase and amplitude continuity status of the at least two adjacent sensing signal pulses comprises:
determining the phase and amplitude continuity status of a set of adjacent sensing signal pulses, wherein the set of adjacent sensing signal pulses comprises the at least two adjacent sensing signal pulses.

31. An apparatus for wireless communications at a user equipment (UE), comprising:
a processor,
memory coupled with the processor; and
instructions stored in the memory and executable by the processor to cause the apparatus to:
receive a configuration for time-division multiplexing of sensing signals in a shared radio frequency spectrum band;
identify, from the configuration, an inter-pulse interval between a first sensing signal pulse and a second sensing signal pulse;
determine that the duration of the inter-pulse interval satisfies a threshold;

determine whether to retune a radio frequency chain of the UE for wireless communications during the inter-pulse interval based at least in part on a duration of the inter-pulse interval and the configuration; and perform wireless communications either during the inter-pulse interval or outside of the inter-pulse interval based on the determination, wherein performing wireless communications during the inter-pulse interval is based at least in part on the duration of the inter-pulse interval satisfying the threshold.

32. The apparatus of claim 31, wherein the instructions to determine whether to retune the radio frequency chain of the UE are executable by the processor to cause the apparatus to:
determine that the duration of the inter-pulse interval fails to satisfy a threshold, wherein performing wireless communications outside of the inter-pulse interval is based at least in part on the duration of the inter-pulse interval failing to satisfy the threshold.

33. The apparatus of claim 31, wherein wireless communications are performed during the inter-pulse interval, and the instructions are further executable by the processor to cause the apparatus to:
retune the radio frequency chain from the first sensing signal pulse to wireless communications during a first retuning gap; and
retune the radio frequency chain from wireless communications to the second sensing signal pulse during a second retuning gap.

34. The apparatus of claim 33, wherein the instructions are further executable by the processor to cause the apparatus to:
receive, from a base station, an indication of the first retuning gap and the second retuning gap.

35. The apparatus of claim 33, wherein the instructions are further executable by the processor to cause the apparatus to:
determine the first retuning gap and the second retuning gap based at least in part on a pre-configured rule of the UE.

36. The apparatus of claim 33, wherein the instructions are further executable by the processor to cause the apparatus to:
determine the first retuning gap and the second retuning gap based at least in part on a capability of the UE.

37. The apparatus of claim 36, wherein the instructions are further executable by the processor to cause the apparatus to:
transmit, to a base station, an indication of the capability of the UE.

38. The apparatus of claim 33, wherein the first retuning gap is longer than the second retuning gap.

39. The apparatus of claim 33, wherein the first retuning gap is three milliseconds or three slots.

40. The apparatus of claim 33, wherein the second retuning gap is zero milliseconds or zero slots.

41. An apparatus for wireless communications at a user equipment (UE), comprising:
a processor,
memory coupled with the processor; and
instructions stored in the memory and executable by the processor to cause the apparatus to:
receive a configuration for time-division multiplexing of sensing signals in a shared radio frequency spectrum band;
determine, based at least in part on the configuration, a phase and amplitude continuity status of at least two adjacent sensing signal pulses, wherein the phase and amplitude continuity status is indicative of a phase and amplitude continuity of the at least two adjacent sensing signal pulses; and
participate in sensing operations that include the at least two adjacent sensing signal pulses based at least in part on the phase and amplitude continuity status and the configuration.

42. The apparatus of claim 41, wherein the instructions are further executable by the processor to cause the apparatus to:
determine a capability of the UE for the at least two adjacent sensing signal pulses to have phase and amplitude continuity, wherein the phase and amplitude continuity status of the at least two adjacent sensing signal pulses is based at least in part on the capability of the UE; and
transmit, to a base station, the capability of the UE.

43. The apparatus of claim 42, wherein the capability of the UE for the at least two adjacent sensing signal pulses to have phase and amplitude continuity is based at least in part on one or both of an inter-pulse interval between the at least two adjacent sensing signal pulses and a presence of wireless communications between the at least two adjacent sensing signal pulses.

44. The apparatus of claim 41, wherein the instructions are further executable by the processor to cause the apparatus to:
perform wireless communications between the at least two adjacent sensing signal pulses.

45. The apparatus of claim 44, wherein the instructions to determine the phase and amplitude continuity status of the at least two adjacent sensing signal pulses are executable by the processor to cause the apparatus to:
determine the phase and amplitude continuity status of the at least two adjacent sensing signal pulses based at least in part on performing wireless communications between the at least two adjacent sensing signal pulses and one or more parameters of wireless communications.

46. The apparatus of claim 45, wherein the one or more parameters of wireless communications comprise one or more of a transmit power of wireless communications, a bandwidth of wireless communications, a waveform of wireless communications, a duration of wireless communications, and a time difference between wireless communications and a next sensing signal pulse.

47. The apparatus of claim 41, wherein the instructions to determine the phase and amplitude continuity status of the at least two adjacent sensing signal pulses are executable by the processor to cause the apparatus to:
determine, based at least in part on the configuration, the phase and amplitude continuity status of a set of adjacent sensing signal pulses, wherein the set of adjacent sensing signal pulses comprises the at least two adjacent sensing signal pulses.

48. An apparatus for wireless communications at a base station, comprising:
a processor,
memory coupled with the processor; and
instructions stored in the memory and executable by the processor to cause the apparatus to:
identify an inter-pulse interval between a first sensing signal pulse and a second sensing signal pulse;
determine that the duration of the inter-pulse interval satisfies a threshold;

transmit, to a user equipment (UE), a configuration for time-division multiplexing of sensing signals with wireless communications with the UE within a shared spectrum, the configuration including the inter-pulse interval between the first sensing signal pulse and the second sensing signal pulse; and perform wireless communications with the UE either during the inter-pulse interval or outside of the inter-pulse interval based at least in part on a duration of the inter-pulse interval, wherein performing wireless communications with the UE during the inter-pulse interval is based at least in part on the duration of the inter-pulse interval satisfying the threshold.

49. The apparatus of claim 48, wherein the instructions are further executable by the processor to cause the apparatus to:

determine that the duration of the inter-pulse interval fails to satisfy a threshold, wherein performing wireless communications with the UE outside of the inter-pulse interval is based at least in part on the duration of the inter-pulse interval failing to satisfy the threshold.

50. The apparatus of claim 48, wherein wireless communications with the UE are performed during the inter-pulse interval, the method further comprising transmitting, to the UE, an indication of a first retuning gap for retuning a radio frequency chain of the UE from the first sensing signal pulse to wireless communications and a second retuning gap for retuning the radio frequency chain of the UE from wireless communications to the second sensing signal pulse.

51. The apparatus of claim 50, wherein the first retuning gap is longer than the second retuning gap.

52. The apparatus of claim 50, wherein the first retuning gap is three milliseconds or three slots.

53. The apparatus of claim 50, wherein the second retuning gap is zero milliseconds or zero slots.

54. An apparatus for wireless communications at a base station, comprising:

a processor, memory coupled with the processor; and instructions stored in the memory and executable by the processor to cause the apparatus to:

determine a phase and amplitude continuity status of at least two adjacent sensing signal pulses, wherein the phase and amplitude continuity status is indicative of the at least two adjacent sensing signal pulses either having phase and amplitude continuity or not having phase and amplitude continuity;

transmit, to a user equipment (UE), a configuration for time-division multiplexing of sensing signals with wireless communications with the UE within a shared spectrum, the configuration including the phase and amplitude continuity status of the at least two adjacent sensing signal pulses; and participate in sensing operations that include the at least two adjacent sensing signal pulses based at least in part on the phase and amplitude continuity status.

55. The apparatus of claim 54, wherein the instructions are further executable by the processor to cause the apparatus to:

receive, from the UE, a capability of the UE for the at least two adjacent sensing signal pulses to have phase and amplitude continuity, wherein the phase and amplitude continuity status is based at least in part on the capability of the UE for the at least two adjacent sensing signal pulses to have phase and amplitude continuity.

56. The apparatus of claim 55, wherein the capability of the UE for the at least two adjacent sensing signal pulses to have phase and amplitude continuity is based at least in part on one or both of an inter-pulse interval between the at least two adjacent sensing signal pulses and a presence of wireless communications between the at least two adjacent sensing signal pulses.

57. The apparatus of claim 54, wherein the instructions are further executable by the processor to cause the apparatus to:

perform wireless communications with the UE between the at least two adjacent sensing signal pulses.

58. The apparatus of claim 57, wherein the instructions to determine the phase and amplitude continuity status of the at least two adjacent sensing signal pulses are executable by the processor to cause the apparatus to:

determine the phase and amplitude continuity status of the at least two adjacent sensing signal pulses based at least in part on performing wireless communications with the UE between the at least two adjacent sensing signal pulses and one or more parameters of wireless communications.

59. The apparatus of claim 58, wherein the one or more parameters of wireless communications comprise one or more of a transmit power of wireless communications, a bandwidth of wireless communications, a waveform of wireless communications, a duration of wireless communications, and a time difference between wireless communications and a next sensing signal pulse.

60. The apparatus of claim 54, wherein the instructions to determine the phase and amplitude continuity status of the at least two adjacent sensing signal pulses are executable by the processor to cause the apparatus to:

determine the phase and amplitude continuity status of a set of adjacent sensing signal pulses, wherein the set of adjacent sensing signal pulses comprises the at least two adjacent sensing signal pulses.

* * * * *